United States Patent
Wang et al.

(10) Patent No.: US 11,978,463 B2
(45) Date of Patent: *May 7, 2024

(54) STEREO SIGNAL ENCODING METHOD AND APPARATUS USING A RESIDUAL SIGNAL ENCODING PARAMETER

(71) Applicant: Huawei Technologies Co., Ltd., Shenzhen (CN)

(72) Inventors: Bin Wang, Shenzhen (CN); Zexin Liu, Beijing (CN); Haiting Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/886,087

(22) Filed: Aug. 11, 2022

(65) Prior Publication Data

US 2022/0392470 A1    Dec. 8, 2022

Related U.S. Application Data

(63) Continuation of application No. 17/104,852, filed on Nov. 25, 2020, now Pat. No. 11,462,224, which is a
(Continued)

(30) Foreign Application Priority Data

May 31, 2018    (CN) .......................... 201810549237.3

(51) Int. Cl.
*G10L 19/02*    (2013.01)
*G10L 19/06*    (2013.01)
(Continued)

(52) U.S. Cl.
CPC .......... *G10L 19/0204* (2013.01); *G10L 19/06* (2013.01); *G10L 25/51* (2013.01);
(Continued)

(58) Field of Classification Search
None
See application file for complete search history.

(56) References Cited

U.S. PATENT DOCUMENTS

2003/0093266 A1    5/2003   Banba
2003/0220783 A1    11/2003  Streich et al.
(Continued)

FOREIGN PATENT DOCUMENTS

CN    101067931 A    11/2007
CN    101160619 A    4/2008
(Continued)

OTHER PUBLICATIONS

Recommendation ITU-T G.711.1, "Series G: Transmission Systems and Media, Digital Systems and Networks; Digital terminal equipments—Coding of voice and audio signals; Wideband embedded extension for ITU-T G.711 pulse code modulation", Recommendation ITU-T G.711.1, Sep. 2012, 218 pages.
(Continued)

*Primary Examiner* — Shaun Roberts
(74) *Attorney, Agent, or Firm* — Conley Rose, P.C.

(57) ABSTRACT

A stereo signal encoding method includes: obtaining a residual signal encoding parameter of a current frame of a stereo signal based on downmixed signal energy and residual signal energy of each of M sub-bands of the current frame, where the residual signal encoding parameter indicates whether to encode residual signals of the M sub-bands; determining whether to encode the residual signals based on the residual signal encoding parameter; and encoding the residual signals when it is determined that the residual signals need to be encoded.

20 Claims, 7 Drawing Sheets

Related U.S. Application Data continuation of application No. PCT/CN2019/076341, filed on Feb. 27, 2019.

(51) Int. Cl.
    *G10L 25/51*        (2013.01)
    *H04L 65/70*       (2022.01)
    *H04L 65/75*       (2022.01)
    *H04S 1/00*        (2006.01)

(52) U.S. Cl.
    CPC .............. *H04L 65/70* (2022.05); *H04L 65/75* (2022.05); *H04S 1/007* (2013.01); *H04S 2400/03* (2013.01)

(56) References Cited

U.S. PATENT DOCUMENTS

| | | |
|---|---|---|
| 2004/0225505 A1 | 11/2004 | Andersen et al. |
| 2006/0190247 A1 | 8/2006 | Lindblom |
| 2006/0233379 A1 | 10/2006 | Villemoes et al. |
| 2007/0063877 A1 | 3/2007 | Shmunk et al. |
| 2007/0171944 A1 | 7/2007 | Schuijers et al. |
| 2008/0097766 A1 | 4/2008 | Kim et al. |
| 2009/0055194 A1 | 2/2009 | Hotho et al. |
| 2009/0083040 A1 | 3/2009 | Myburg et al. |
| 2009/0171672 A1 | 7/2009 | Philippe et al. |
| 2010/0014679 A1 | 1/2010 | Kim et al. |
| 2011/0040556 A1 | 2/2011 | Moon et al. |
| 2011/0082700 A1 | 4/2011 | Myburg et al. |
| 2012/0185255 A1 | 7/2012 | Virette et al. |
| 2014/0226822 A1 | 8/2014 | Engdegard et al. |
| 2015/0124974 A1 | 5/2015 | Kim et al. |
| 2015/0255078 A1 | 9/2015 | Baeck et al. |
| 2016/0142845 A1 | 5/2016 | Dick et al. |
| 2016/0275957 A1 | 9/2016 | Dick et al. |
| 2017/0125023 A1 | 5/2017 | Oh et al. |
| 2018/0040328 A1 | 2/2018 | Dick et al. |
| 2018/0144751 A1 | 5/2018 | Purnhagen et al. |

FOREIGN PATENT DOCUMENTS

| | | |
|---|---|---|
| CN | 101393743 A | 3/2009 |
| CN | 101635145 A | 1/2010 |
| CN | 102243876 A | 11/2011 |
| CN | 102577384 A | 7/2012 |
| CN | 104170007 A | 11/2014 |
| CN | 105556596 A | 5/2016 |
| EP | 2690621 A1 | 1/2014 |
| JP | 2007531915 A | 11/2007 |
| JP | 2008519306 A | 6/2008 |
| JP | 2008519307 A | 6/2008 |
| JP | 2016531483 A | 10/2016 |
| WO | 2006048817 A1 | 5/2006 |
| WO | 2014021588 A1 | 2/2014 |
| WO | 2017049399 A1 | 3/2017 |

OTHER PUBLICATIONS

Zhang Shuhua et al.,"Signal Processing with the MDCT and Its Application in Stereo Coding", Dissertation Submitted to Tsinghua University in partial fulfillment of the requirement for the degree of Doctor of Engineering, Dec. 2010, 124 pages.

Tkhwana Elfitri et al., "Experimental Study on Improved Parametric Stereo for Bit Rate Scalable Audio Coding",2014 6th International Conference on Information Technology and Electrical Engineering (ICITEE), Yogyakarta, Indonesia, Oct. 7-8, 2014, 5 pages.

ISO/IEC FDIS 23003-3:2011(E), "Information technology—MPEG audio technologies—Part 3: Unified speech and audio coding," ISO/IEC JTC 1/SC 29/WG 11. Sep. 20, 2011, 291 pages.

STEREO SIGNAL ENCODING METHOD AND APPARATUS USING A RESIDUAL SIGNAL ENCODING PARAMETER

CROSS-REFERENCE TO RELATED APPLICATIONS

This is a continuation of U.S. patent application Ser. No. 17/104,852 filed on Nov. 25, 2020, which is a continuation of International Patent Application No. PCT/CN2019/076341 filed on Feb. 27, 2019, which claims priority to Chinese Patent Application No. 201810549237.3 filed on May 31, 2018. All of the aforementioned patent applications are hereby incorporated by reference in their entireties.

TECHNICAL FIELD

This application relates to the audio field, and in particular, to a stereo signal encoding method and apparatus.

BACKGROUND

A general process of encoding a stereo signal using a time-domain or time-frequency domain stereo coding technology includes performing time-domain pre-processing on a left channel time-domain signal and a right channel time-domain signal, performing time-domain analysis on a left channel time-domain signal and a right channel time-domain signal that are obtained through time-domain pre-processing, performing time-frequency domain transformation on the left channel time-domain signal and the right channel time-domain signal that are obtained through time-domain pre-processing, to obtain a left channel frequency-domain signal and a right channel frequency-domain signal, determining an inter-channel time difference (ITD) parameter in time domain, performing time-shift adjustment on the left frequency-domain signal and the right channel frequency-domain signal based on the ITD parameter, and calculating a stereo parameter, a downmixed signal, and a residual signal based on a left channel frequency-domain signal and a right channel frequency-domain signal that are obtained through time-shift adjustment, and encoding the stereo parameter, the downmixed signal, and the residual signal.

It is known that in some other approaches, when a coding rate is comparatively low, only a stereo parameter and a downmixed signal are generally encoded, and some or all of residual signals are encoded only when a coding rate is comparatively high. In this case, a spatial sense of a decoded stereo signal is comparatively poor and sound-image stability of the decoded stereo signal is comparatively poor.

It is known that in another other approaches, when a coding rate is comparatively low, in addition to a downmixed signal, a residual signal of a sub-band that meets a preset bandwidth range is also encoded. Although this encoding method can improve spatial sense and sound-image stability of a decoded stereo signal, because a total quantity of encoding bits used for encoding the residual signal and encoding the downmixed signal is fixed, and low-frequency information is preferentially encoded during downmixed signal encoding, when the downmixed signal is to be encoded, there may not be enough bits to encode some signals with richer high-frequency information in the downmixed signal. Therefore, high-frequency distortion of a decoded stereo signal is comparatively large, thereby affecting encoding quality.

SUMMARY

This application provides a stereo signal encoding method such that high-frequency distortion of a decoded stereo signal can be reduced as much as possible while a spatial sense and sound-image stability of the decoded stereo signal are improved, thereby improving encoding quality.

According to a first aspect, a stereo signal encoding method is provided. The method includes determining a residual signal encoding parameter of a current frame of a stereo signal based on downmixed signal energy and residual signal energy of each of M sub-bands of the current frame, where the residual signal encoding parameter of the current frame indicates whether to encode residual signals of the M sub-bands, the M sub-bands are at least some of N sub-bands, N is a positive integer greater than 1, M≤N, and M is a positive integer, and determining, based on the residual signal encoding parameter of the current frame, whether to encode the residual signals of the M sub-bands of the current frame.

The residual signal encoding parameter is determined based on downmixed signal energy and residual signal energy of M sub-bands that are in the N sub-bands and that meet a preset bandwidth range, and whether to encode a residual signal of each of the M sub-bands is determined based on the residual signal encoding parameter. This avoids encoding only a downmixed signal when a coding rate is comparatively low. Alternatively, whether to encode all residual signals of sub-bands that meet a preset bandwidth range is determined based on the residual signal encoding parameter. Therefore, high-frequency distortion of a decoded stereo signal can be reduced as much as possible while a spatial sense and sound-image stability of the decoded stereo signal are improved, thereby improving encoding quality.

With reference to the first aspect, in a possible implementation of the first aspect, the M sub-bands are M sub-bands whose sub-band index numbers are less than or equal to a preset maximum sub-band index number in the N sub-bands.

Optionally, in an implementation, the M sub-bands are M sub-bands whose sub-band index numbers are greater than or equal to a preset minimum sub-band index number and less than or equal to a preset maximum sub-band index number in the N sub-bands.

The minimum sub-band index number and/or the maximum sub-band index number are/is set based on different coding rates. The residual signal encoding parameter is determined based on the different coding rates, and downmixed signal energy and residual signal energy of a plurality of specific sub-bands in the N sub-bands, and whether to encode a residual signal of each of the M sub-bands is determined based on the residual signal encoding parameter. This avoids encoding only a downmixed signal when a coding rate is comparatively low. Alternatively, whether to encode all residual signals of sub-bands that meet the preset bandwidth range is determined based on the residual signal encoding parameter. Therefore, high-frequency distortion of a decoded stereo signal can be reduced as much as possible while a spatial sense and sound-image stability of the decoded stereo signal are improved, thereby improving encoding quality.

With reference to the first aspect, in a possible implementation of the first aspect, the determining, based on the residual signal encoding parameter of the current frame, whether to encode the residual signal of each of the M sub-bands includes comparing the residual signal encoding parameter of the current frame with a preset first threshold, where the first threshold is greater than 0 and less than 1.0, and when the residual signal encoding parameter of the current frame is less than or equal to the first threshold, determining not to encode the residual signal of each of the M sub-bands, or when the residual signal encoding parameter of the current frame is greater than the first threshold, determining to encode the residual signal of each of the M sub-bands.

The first threshold is set, and the determined residual signal encoding parameter is compared with the first threshold. Whether to encode the residual signal of each of the M sub-bands is determined based on a comparison result between the residual signal encoding parameter and the first threshold. This avoids encoding only a downmixed signal when a coding rate is comparatively low. Alternatively, whether to encode all residual signals of sub-bands that meet the preset bandwidth range is determined based on a comparison result between the residual signal encoding parameter and the first threshold. Therefore, high-frequency distortion of a decoded stereo signal can be reduced as much as possible while a spatial sense and sound-image stability of the decoded stereo signal are improved, thereby improving encoding quality.

With reference to the first aspect, in a possible implementation of the first aspect, the determining a residual signal encoding parameter of a current frame based on downmixed signal energy and residual signal energy of each of M sub-bands includes determining the residual signal encoding parameter based on the downmixed signal energy, the residual signal energy, and a side gain of each of the M sub-bands.

The residual signal encoding parameter is determined based on the downmixed signal energy, the residual signal energy, and the side gain each of the M sub-bands, and whether to encode a residual signal of each of the M sub-bands is determined based on the residual signal encoding parameter. This avoids encoding only a downmixed signal when a coding rate is comparatively low. Alternatively, whether to encode all residual signals of sub-bands that meet the preset bandwidth range is determined based on the residual signal encoding parameter. Therefore, high-frequency distortion of a decoded stereo signal can be reduced as much as possible while a spatial sense and sound-image stability of the decoded stereo signal are improved, thereby improving encoding quality.

With reference to the first aspect, in a possible implementation of the first aspect, the determining the residual signal encoding parameter based on the downmixed signal energy, the residual signal energy, and a side gain of each of the M sub-bands includes determining a first parameter based on the downmixed signal energy, the residual signal energy, and the side gain of each of the M sub-bands, where the first parameter indicates a value relationship between the downmixed signal energy and the residual signal energy of each of the M sub-bands, determining a second parameter based on the downmixed signal energy and the residual signal energy of each of the M sub-bands, where the second parameter indicates a value relationship between a first energy sum and a second energy sum, the first energy sum is a sum of residual signal energy and downmixed signal energy of the M sub-bands, the second energy sum is a sum of residual signal energy and downmixed signal energy of M sub-bands in a frequency-domain signal of a previous frame of the current frame, and the M sub-bands of the current frame have the same sub-band index numbers as the M sub-bands of the previous frame, and determining the residual signal encoding parameter of the current frame based on the first parameter, the second parameter, and a long-term smoothing parameter of the previous frame of the current frame.

With reference to the first aspect, in a possible implementation of the first aspect, the determining a first parameter based on the downmixed signal energy, the residual signal energy, and the side gain of each of the M sub-bands includes determining M energy parameters based on the downmixed signal energy, the residual signal energy, and the side gain of each of the M sub-bands, where the M energy parameters each indicate the value relationship between the downmixed signal energy and the residual signal energy of each of the M sub-bands, and the M energy parameters one-to-one correspond to the M sub-bands, and determining an energy parameter with a largest value in the M energy parameters as the first parameter.

With reference to the first aspect, in a possible implementation of the first aspect, an energy parameter of a sub-band whose sub-band index number is b in the M energy parameters meets a formula:

$$\text{res\_dmx\_ratio}[b] = \text{res\_cod\_NRG\_S}[b] / (\text{res\_cod\_NRG\_S}[b] + (1-g(b)) \cdot (1-g(b)) \cdot \text{res\_cod\_NRG\_M}[b] + 1)$$

where res_dmx_ratio[b] represents the energy parameter of the sub-band whose sub-band index number is b, b is greater than or equal to 0 and is less than or equal to the preset maximum sub-band index number, res_cod_NRG_S[b] represents residual signal energy of the sub-band whose sub-band index number is b, res_cod_NRG_M[b] represents downmixed signal energy of the sub-band whose sub-band index number is b, and g(b) represents a function of a side gain side_gain[b] of the sub-band whose sub-band index number is b.

With reference to the first aspect, in a possible implementation of the first aspect, the determining a residual signal encoding parameter of a current frame based on downmixed signal energy and residual signal energy of each of the M sub-bands includes determining a first parameter based on the downmixed signal energy and the residual signal energy of each of the M sub-bands, where the first parameter indicates a value relationship between the downmixed signal energy and the residual signal energy of each of the M sub-bands, determining a second parameter based on the downmixed signal energy and the residual signal energy of each of the M sub-bands, where the second parameter indicates a value relationship between a first energy sum and a second energy sum, the first energy sum is a sum of residual signal energy and downmixed signal energy of the M sub-bands, the second energy sum is a sum of residual signal energy and downmixed signal energy of M sub-bands in a frequency-domain signal of a previous frame of the current frame, and the M sub-bands of the current frame have the same sub-band index numbers as the M sub-bands of the previous frame, and determining the residual signal encoding parameter of the current frame based on the first parameter, the second parameter, and a long-term smoothing parameter of the previous frame of the current frame.

With reference to the first aspect, in a possible implementation of the first aspect, the determining a first parameter based on the downmixed signal energy and the residual signal energy of each of the M sub-bands includes determining M energy parameters based on the downmixed signal energy and the residual signal energy of each of the M sub-bands, where the M energy parameters each indicate the value relationship between the downmixed signal energy and the residual signal energy of each of the M sub-bands, and the M energy parameters one-to-one correspond to the M sub-bands, and determining an energy parameter with a largest value in the M energy parameters as the first parameter.

Optionally, in an implementation, a sum of the M energy parameters is determined as the first parameter (to be corrected) res_dmx_ratio$_1$, res_dmx_ratio$_1$ is corrected based on a maximum value res_dmx_ratio max in the M energy parameters and the downmixed signal energy res_cod_NRG_M[b] of each of the M sub-bands, and res_dmx_ratio$_2$ obtained through correction is determined.

For example, an encoder side corrects res_dmx_ratio$_1$ according to the following formula, where M=5, and res_dmx_ratio$_2$ obtained through correction meets:

$$\text{res\_dmx\_ratio}_2 = (\text{res\_dmx\_ratio\_max} > 0.32 ||$$
$$(\text{res\_cod\_NRG\_M}[0] + \text{res\_cod\_NRG\_M}[1] + \text{res\_cod\_NRG\_M}[2]) >$$
$$512.0 \cdot (\text{res\_cod\_NRG\_M}[3] + \text{res\_cod\_NRG\_M}[4]))$$
$$\text{res\_dmx\_ratio\_max:res\_dmx\_ratio} \cdot 0.2.$$

Optionally, in an implementation, res_dmx_ratio$_2$ obtained through correction may be further corrected.

For example, res_dmx_ratio$_3$ finally obtained through correction meets:

$$\text{res\_dmx\_ratio}_3 = \text{pow}(\text{res\_dmx\_ratio}_2, 1.2),$$

where pow( ) function represents an exponential function, and pow(res_dmx_ratio$_2$,1.2) represents the 1.2 power of res_dmx_ratio$_2$.

Optionally, in an implementation, the encoder side determines the first parameter based on a sum of residual signal energy of the M sub-bands and a sum of downmixed signal energy of the M sub-bands.

Further, the encoder side separately determines the sum dmx_nrg_all_curr of the downmixed signal energy of the M sub-bands and the sum res_nrg_all_curr of the residual signal energy of the M sub-bands, and determines the first parameter based on dmx_nrg_all_curr and res_nrg_all_curr.

Optionally, in an implementation, the sum dmx_nrg_all_curr of the downmixed signal energy of the M sub-bands meets:

$$\text{dmx\_nrg\_all\_curr} = \sum_{b=0}^{b=M-1} \left( \gamma_1 \cdot \text{res\_cod\_NRG\_M}[b] + (1 - \gamma_1) \cdot \text{res\_cod\_NRG\_M\_prev}[b] \right),$$

where res_cod_NRG_M_prev[b] represents downmixed signal energy of a sub-band whose sub-band index number is b in the previous frame of the current frame, represents a smoothing factor, and $\gamma_1$ is a real number greater than or equal to 0 and less than or equal to 1, for example, $\gamma_1$=0.1.

Optionally, in an implementation, the sum res_nrg_all_curr of the residual signal energy of the M sub-bands meets:

$$\text{res\_nrg\_all\_curr} = \sum_{b=0}^{b=M-1} \left( \gamma_2 \cdot \text{res\_cod\_NRG\_S}[b] + (1 - \gamma_2) \cdot \text{res\_cod\_NRG\_S\_prev}[b] \right),$$

where res_cod_NRG_S_prev[b] represents residual signal energy of a sub-band whose sub-band index number is b in the previous frame of the current frame, $\gamma_2$ represents a smoothing factor, and $\gamma_2$ is a real number greater than or equal to 0 and less than or equal to 1, for example, $\gamma_2$=0.1.

The encoder side determines the first parameter res_dmx_ratio based on dmx_nrg_all_curr and res_nrg_all_curr.

For example, the first parameter res_dmx_ratio finally determined by the encoder side meets:

res_dmx_ratio=res_nrg_all_curr/dmx_nrg_all_curr.

With reference to the first aspect, in a possible implementation of the first aspect, an energy parameter of a sub-band whose sub-band index number is b in the M energy parameters meets a formula:

res_dmx_ratio[b]=res_cod_NRG_S[b]/res_cod_NRG_M[b], where res_dmx_ratio[b] represents the energy parameter of the sub-band whose sub-band index number is b, b is greater than or equal to 0 and is less than or equal to the preset maximum sub-band index number, res_cod_NRG_S[b] represents residual signal energy of the sub-band whose sub-band index number is b, and res_cod_NRG_M[b] represents downmixed signal energy of the sub-band whose sub-band index number is b.

With reference to the first aspect, in a possible implementation of the first aspect, the residual signal encoding parameter of the current frame is a long-term smoothing parameter of the current frame, and the long-term smoothing parameter of the current frame meets a formula:

res_dmx_ratio_lt=res_dmx_ratio·α+
res_dmx_ratio_lt_prev(1−α), where res_dmx_ratio_lt represents the long-term smoothing parameter of the current frame, res_dmx_ratio represents the first parameter, res_dmx_ratio_lt_prev represents the long-term smoothing parameter of the previous frame of the current frame, and 0<α<1, and when the second parameter is greater than a preset third threshold, a value of a when the first parameter is less than a preset second threshold is greater than a value of a when the first parameter is greater than or equal to the preset second threshold, the second threshold is greater than or equal to 0 and less than or equal to 0.6, and the third threshold is greater than or equal to 2.7 and less than or equal to 3.7, or when the second parameter is less than a preset fifth threshold, a value of a when the first parameter is greater than a preset fourth threshold is greater than a value of a when the first parameter is less than or equal to the preset fourth threshold, the fourth threshold is greater than or equal to 0 and less than or equal to 0.9, and the fifth threshold is greater than or equal to 0 and less than or equal to 0.71, or when the second parameter is greater than or equal to a preset fifth threshold and is less than or equal to a preset third threshold, a value of a is less than a value of a when the first parameter is less than a preset second threshold and the second parameter is greater than the preset third threshold, the second threshold is greater than or equal to 0 and less than or equal to 0.6, the third threshold is greater than or equal to 2.7 and less than or equal to 3.7, and the fifth threshold is greater than or equal to 0 and less than or equal to 0.71.

With reference to the first aspect, in a possible implementation of the first aspect, the method further includes, when it is determined to encode the residual signals of the M sub-bands, encoding downmixed signals and the residual signals of the M sub-bands, or when it is determined not to encode the residual signals of the M sub-bands, encoding downmixed signals of the M sub-bands.

According to a second aspect, an encoding apparatus is provided. The apparatus includes a first determining module configured to determine a residual signal encoding parameter of a current frame of a stereo signal based on downmixed signal energy and residual signal energy of each of M sub-bands of the current frame, where the residual signal encoding parameter of the current frame indicates whether to encode residual signals of the M sub-bands, the M sub-bands are at least some of N sub-bands, N is a positive integer greater than 1, M≤N, and M is a positive integer, and a second determining module configured to determine, based on the residual signal encoding parameter of the current frame, whether to encode the residual signals of the M sub-bands.

According to a third aspect, an encoding apparatus is provided. The apparatus includes a memory and a processor, where the memory is configured to store a program, the processor is configured to execute the program, and when the program is executed, the processor performs the method according to any one of the first aspect or the possible implementations of the first aspect.

According to a fourth aspect, a computer readable storage medium is provided. The computer readable medium stores program code to be executed by a device, and the program code includes an instruction used to perform the method according to the first aspect or the various implementations of the first aspect.

According to a fifth aspect, a chip is provided. The chip includes a processor and a communications interface. The communications interface is configured to communicate with an external device. The processor is configured to perform the method according to any one of the first aspect or the possible implementations of the first aspect.

Optionally, in an implementation, the chip may further include a memory. The memory stores an instruction, and the processor is configured to execute the instruction stored in the memory. When the instruction is executed, the processor is configured to perform the method according to any one of the first aspect or the possible implementations of the first aspect.

Optionally, in an implementation, the chip is integrated into a terminal device or a network device.

DESCRIPTION OF EMBODIMENTS

The following describes the technical solutions of this application with reference to the accompanying drawings.

Figure 1:
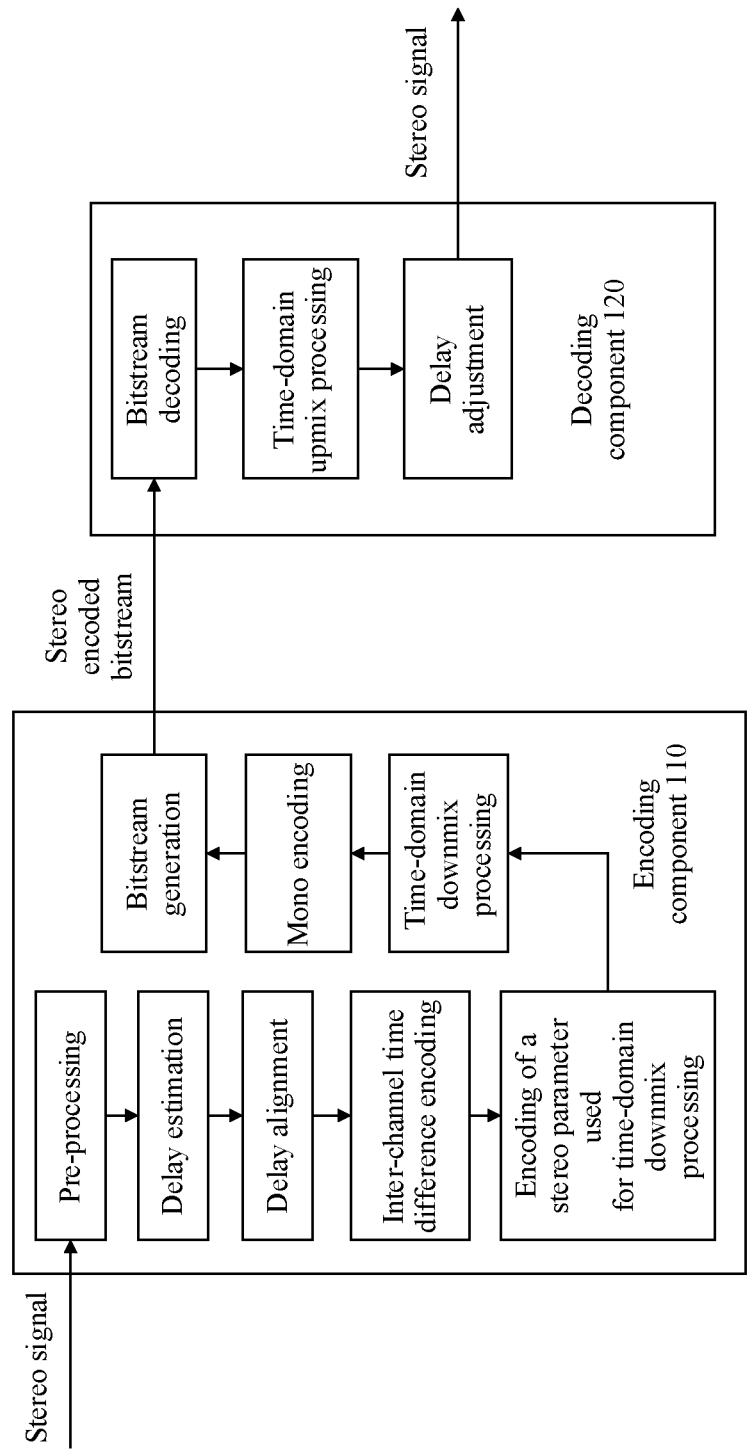
FIG. 1 is a schematic structural diagram of a stereo encoding and decoding system in time domain according to an embodiment of this application.

FIG. 1 is a schematic structural diagram of a stereo encoding and decoding system in time domain according to an example embodiment of this application. The stereo encoding and decoding system includes an encoding component 110 and a decoding component 120.

The encoding component 110 is configured to encode a stereo signal in time domain. Optionally, the encoding component 110 may be implemented using software, or may be implemented using hardware, or may be implemented in a form of a combination of software and hardware. This is not limited in this embodiment.

The encoding component 110 encodes the stereo signal in time domain, including the following several steps.

(1) Perform time-domain pre-processing on an obtained stereo signal to obtain a left channel signal that is obtained through time-domain pre-processing and a right channel signal that is obtained through time-domain pre-processing.

The stereo signal is collected by a collection component and is sent to the encoding component 110. Optionally, the collection component and the encoding component 110 may be disposed in a same device. Alternatively, the collection component and the encoding component 110 may be disposed in different devices.

The left channel signal that is obtained through preprocessing and the right channel signal that is obtained through pre-processing are two channels of signals in the stereo signal that is obtained through pre-processing.

Optionally, pre-processing includes at least one of highpass filtering processing, pre-emphasis processing, sample rate conversion, and channel conversion. This is not limited in this embodiment.

(2) Perform delay estimation based on the left channel signal that is obtained through pre-processing and the right channel signal that is obtained through pre-processing, to obtain an ITD between the left channel signal that is obtained through pre-processing and the right channel signal that is obtained through pre-processing.

(3) Perform, based on the ITD, delay alignment processing on the left channel signal that is obtained through pre-processing and the right channel signal that is obtained through pre-processing, to obtain a left channel signal that is obtained through delay alignment processing and a right channel signal that is obtained through delay alignment processing.

(4) Encode the ITD to obtain an encoding index of the ITD.

(5) Calculate a stereo parameter used for time-domain downmix processing, and encode the stereo parameter used for time-domain downmix processing, to obtain an encoding index of the stereo parameter used for time-domain downmix processing.

The stereo parameter used for time-domain downmix processing is used to perform time-domain downmix processing on the left channel signal that is obtained through delay alignment processing and the right channel signal that is obtained through delay alignment processing.

(6) Perform, based on the stereo parameter used for time-domain downmix processing, time-domain downmix processing on the left channel signal that is obtained through delay alignment processing and the right channel signal that is obtained through delay alignment processing, to obtain a primary channel signal and a secondary channel signal.

The primary channel signal is used to represent information about a correlation between channels. The secondary channel signal is used to information about a difference between channels. When the left channel signal that is obtained through delay alignment processing and the right channel signal that is obtained through delay alignment processing are aligned in time domain, the secondary channel signal is the smallest. In this case, the stereo signal has a best effect.

(7) Encode the primary channel signal and the secondary channel signal separately, to obtain a first mono encoded bitstream corresponding to the primary channel signal and a second mono encoded bitstream corresponding to the secondary channel signal.

(8) Write the encoding index of the ITD, the encoding index of the stereo parameter, the first mono encoded bitstream, and the second mono encoded bitstream into a stereo encoded bitstream.

The decoding component 120 is configured to decode the stereo encoded bitstream generated by the encoding component 110, to obtain the stereo signal.

Optionally, the encoding component 110 is connected to the decoding component 120 in a wired or wireless manner, and the decoding component 120 obtains, over this connection, the stereo encoded bitstream generated by the encoding component 110. Alternatively, the encoding component 110 stores the generated stereo encoded bitstream in a memory, and the decoding component 120 reads the stereo encoded bitstream in the memory.

Optionally, the decoding component 120 may be implemented using software, or may be implemented using hardware, or may be implemented in a form of a combination of software and hardware. This is not limited in this embodiment.

The decoding component 120 decodes the stereo encoded bitstream to obtain the stereo signal, including the following several steps:

(1) Decode the first mono encoded bitstream and the second mono encoded bitstream in the stereo encoded bitstream to obtain the primary channel signal and the secondary channel signal.

(2) Obtain, based on the stereo encoded bitstream, an encoding index of a stereo parameter used for time-domain upmix processing, and perform time-domain upmix processing on the primary channel signal and the secondary channel signal to obtain a left channel signal that is obtained through time-domain upmix processing and a right channel signal that is obtained through time-domain upmix processing.

(3) Obtain the encoding index of the ITD based on the stereo encoded bitstream, and perform delay adjustment on the left channel signal that is obtained through time-domain upmix processing and the right channel signal that is obtained through time-domain upmix processing, to obtain the stereo signal.

Optionally, the encoding component 110 and the decoding component 120 may be disposed in a same device, or may be disposed in different devices. The device may be a mobile terminal having an audio signal processing function, such as a mobile phone, a tablet computer, a laptop portable computer, a desktop computer, a BLUETOOTH speaker, a pen recorder, or a wearable device, or may be a network element having an audio signal processing capability in a core network or a wireless network. This is not limited in this embodiment.

Figure 2:
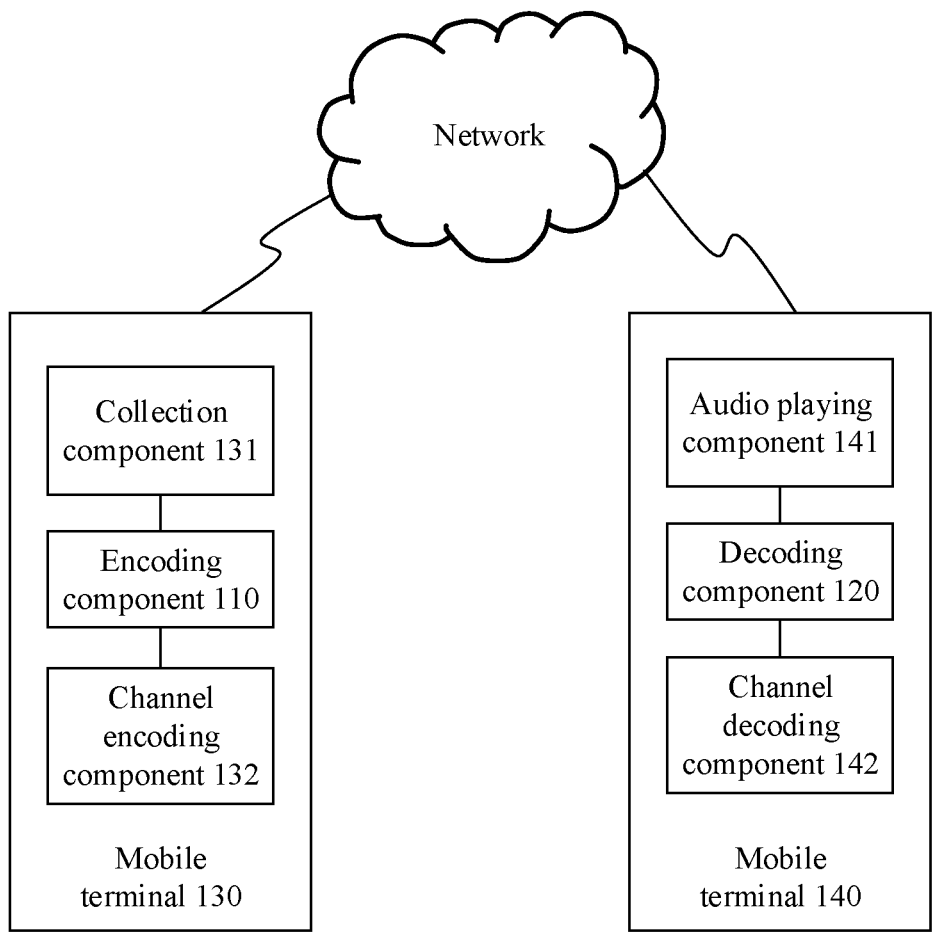
FIG. 2 is a schematic diagram of a mobile terminal according to an embodiment of this application.

For example, as shown in FIG. 2, in this embodiment, a description is provided using an example in which the encoding component 110 is disposed in a mobile terminal 130, and the decoding component 120 is disposed in a mobile terminal 140, the mobile terminal 130 and the mobile terminal 140 are mutually independent electronic devices having an audio signal processing capability, for example, may be a mobile phone, a wearable device, a virtual reality (VR) device, an augmented reality (AR) device, or the like, and the mobile terminal 130 is connected to the mobile terminal 140 using a wireless or wired network.

Optionally, the mobile terminal 130 includes a collection component 131, the encoding component 110, and a channel encoding component 132. The collection component 131 is connected to the encoding component 110, and the encoding component 110 is connected to the channel encoding component 132.

Optionally, the mobile terminal 140 includes an audio playing component 141, the decoding component 120, and a channel decoding component 142. The audio playing component 141 is connected to the decoding component 120, and the decoding component 120 is connected to the channel decoding component 142.

After collecting a stereo signal using the collection component 131, the mobile terminal 130 encodes the stereo signal using the encoding component 110, to obtain a stereo encoded bitstream, and then encodes the stereo encoded bitstream using the channel encoding component 132, to obtain a transmission signal.

The mobile terminal 130 sends the transmission signal to the mobile terminal 140 using the wireless or wired network.

After receiving the transmission signal, the mobile terminal 140 decodes the transmission signal using the channel decoding component 142, to obtain the stereo encoded bitstream, decodes the stereo encoded bitstream using the decoding component 120, to obtain the stereo signal, and plays the stereo signal using the audio playing component 141.

Figure 3:
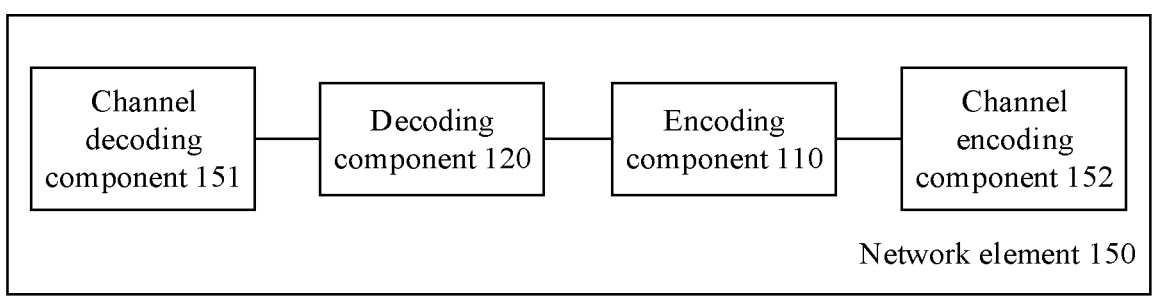
FIG. 3 is a schematic diagram of a network element according to an embodiment of this application.

For example, as shown in FIG. 3, in this embodiment, a description is provided using an example in which the encoding component 110 and the decoding component 120 are disposed in a network element 150 having an audio signal processing capability in a same core network or wireless network.

Optionally, the network element 150 includes a channel decoding component 151, the decoding component 120, the encoding component 110, and a channel encoding component 152. The channel decoding component 151 is connected to the decoding component 120, the decoding component 120 is connected to the encoding component 110, and the encoding component 110 is connected to the channel encoding component 152.

After receiving a transmission signal sent by another device, the channel decoding component 151 decodes the transmission signal to obtain a first stereo encoded bitstream, the decoding component 120 decodes the first stereo encoded bitstream to obtain a stereo signal, the encoding component 110 encodes the stereo signal to obtain a second stereo encoded bitstream, and the channel encoding component 152 encodes the second stereo encoded bitstream to obtain the transmission signal.

The other device may be a mobile terminal having an audio signal processing capability, or may be another network element having an audio signal processing capability. This is not limited in this embodiment.

Optionally, the encoding component 110 and the decoding component 120 in the network element may transcode a stereo encoded bitstream sent by the mobile terminal.

Optionally, in this embodiment, a device on which the encoding component 110 is installed is referred to as an audio encoding device. In actual implementation, the audio encoding device may also have an audio decoding function. This is not limited in this embodiment.

Optionally, this embodiment is described using only the stereo signal as an example. In this application, the audio encoding device may further process a multi-channel signal, and the multi-channel signal includes at least two channels of signals.

Figure 4:
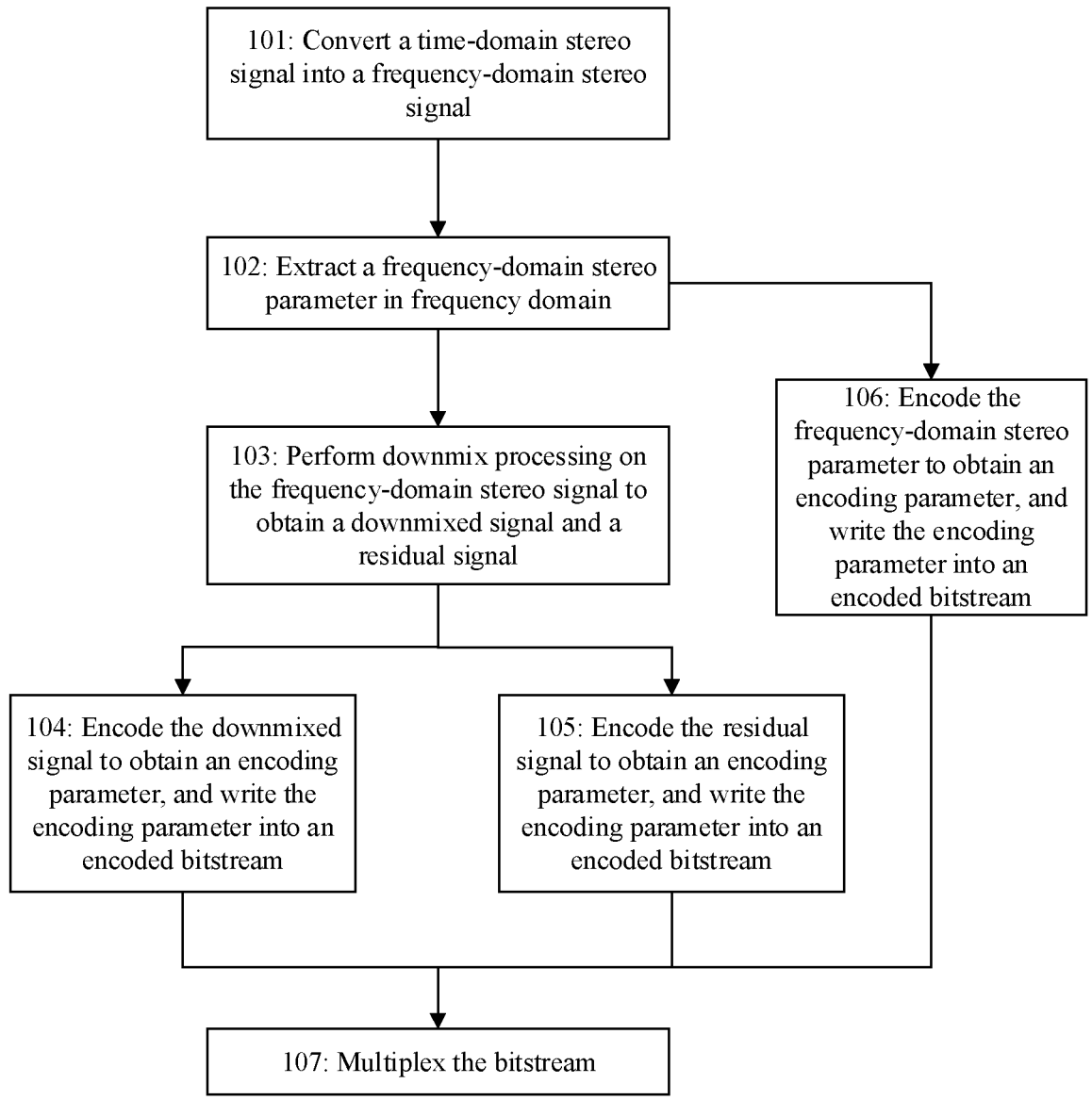
FIG. 4 is a schematic flowchart of a frequency-domain stereo signal encoding method.
Figure 5:
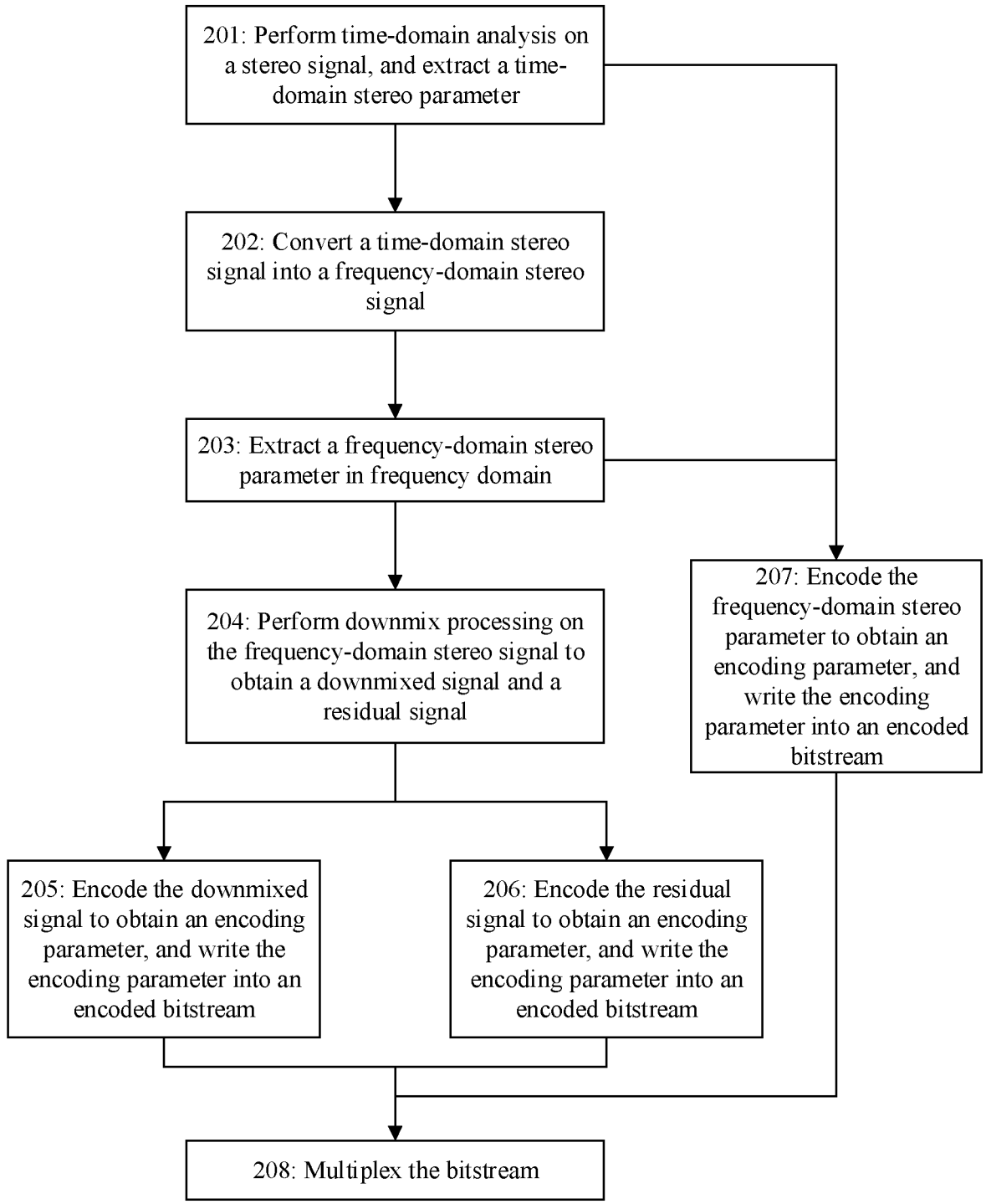
FIG. 5 is a schematic flowchart of a time-frequency domain stereo signal encoding method.

To facilitate understanding of a stereo signal encoding method in the embodiments of this application, the following first generally describes an entire encoding process of a frequency-domain stereo encoding method and a time-frequency domain stereo encoding method respectively with reference to FIG. 4 and FIG. 5.

FIG. 4 is a schematic flowchart of a frequency-domain stereo signal encoding method. The encoding method includes 101 to 107.

101: Convert a time-domain stereo signal into a frequency-domain stereo signal.

102: Extract a frequency-domain stereo parameter in frequency domain.

103: Perform downmix processing on the frequency-domain stereo signal to obtain a downmixed signal and a residual signal.

The downmixed signal may also be referred to as a central channel signal or a primary channel signal, and the residual signal may be referred to as a side channel signal or a secondary channel signal.

104: Encode the downmixed signal to obtain an encoding parameter corresponding to the downmixed signal, and write the encoding parameter into an encoded bitstream.

106: Encode the frequency-domain stereo parameter to obtain an encoding parameter corresponding to the frequency-domain stereo parameter, and write the encoding parameter into an encoded bitstream.

In an optional implementation, the method may further include the following.

105: Encode the residual signal to obtain an encoding parameter corresponding to the residual signal, and write the encoding parameter into an encoded bitstream.

107: Multiplex the bitstream.

FIG. 5 is a schematic flowchart of a time-frequency domain stereo signal encoding method. The encoding method includes 201 to 208.

201: Perform time-domain analysis on a stereo signal, and extract a time-domain stereo parameter.

202: Convert a time-domain stereo signal into a frequency-domain stereo signal.

203: Extract a frequency-domain stereo parameter in frequency domain.

204: Perform downmix processing on the frequency-domain stereo signal to obtain a downmixed signal and a residual signal.

205: Encode the downmixed signal to obtain an encoding parameter corresponding to the downmixed signal, and write the encoding parameter into an encoded bitstream.

207: Encode the time-domain stereo parameter and the frequency-domain stereo parameter to obtain an encoding parameter corresponding to the time-domain stereo parameter and an encoding parameter corresponding to the frequency-domain stereo parameter, and write the encoding parameters into an encoded bitstream.

Optionally, the method further includes the following.

206: Encode the residual signal to obtain an encoding parameter corresponding to the residual signal, and write the encoding parameter into an encoded bitstream.

208: Multiplex the bitstream.

When a coding rate is comparatively low, for example, when an encoding bandwidth is Wideband, if the coding rate is comparatively low, such as 26 kilobits per second (kbps), 16.4 kbps, 24.4 kbps, or 32 kbps, to improve a spatial sense and stability during playback of the stereo signal and reduce high-frequency distortion of the stereo signal, and when a downmixed signal of each frame of stereo signal is encoded, all residual signals of sub-bands that meet a preset bandwidth range are encoded. Alternatively, when a coding rate is comparatively low, only a stereo parameter and a downmixed signal are encoded. Some or all of residual signals are encoded only when the coding rate is comparatively high, such as 48 kbps, 64 kbps, or 96 kbps. This application provides a stereo signal encoding method. In this method, high-frequency distortion of a decoded stereo signal can be reduced as much as possible while a spatial sense and sound-image stability of the decoded stereo signal are improved, thereby improving overall encoding quality.

Figure 6:
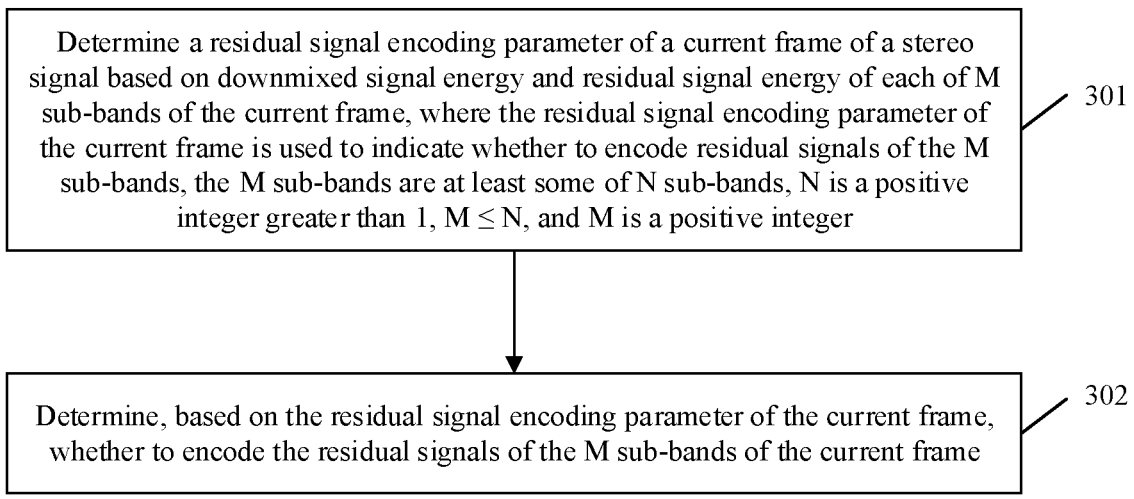
FIG. 6 is a schematic flowchart of a stereo signal encoding method according to an embodiment of this application.

FIG. 6 is a schematic flowchart of a stereo signal encoding method 300 according to an embodiment of this application. The method 300 may be executed by an encoder side, and the encoder side may be an encoder or a device having a stereo signal encoding function. The method 300 includes at least the following steps.

The stereo signal encoding method in this application may be a stereo encoding method that can be independently applied, or may be a stereo encoding method applied to multi-channel signal encoding. The encoder side processes a stereo signal by frame. The following uses a wideband stereo signal with a signal length of each frame being 20 milliseconds (ms) as an example, and uses a frame (for example, a current frame) that is being processed by the encoder side as an example to describe in detail a stereo signal encoding method in the method 300.

301: Determine a residual signal encoding parameter of a current frame of a stereo signal based on downmixed signal energy and residual signal energy of each of M sub-bands of the current frame, where the residual signal encoding parameter of the current frame indicates whether to encode residual signals of the M sub-bands, the M sub-bands are at least some of N sub-bands, N is a positive integer greater than 1, M≤N, and M is a positive integer.

Further, the encoder side divides spectral coefficients of the current frame of the stereo signal to obtain N sub-bands, and determines the residual signal encoding parameter of the current frame based on downmixed signal energy and residual signal energy of each of at least some of the N sub-bands (for example, M sub-bands in the N sub-bands, M≤N), where the residual signal encoding parameter of the current frame can be used by the encoder side to determine whether to encode a residual signal of each of the M sub-bands.

302: Determine, based on the residual signal encoding parameter of the current frame, whether to encode the residual signals of the M sub-bands of the current frame.

Further, the encoder side determines, based on the residual signal encoding parameter, determined in step 301, of the current frame, whether to encode the residual signal of each of the M sub-bands of the current frame.

When it is determined to encode the residual signal of each of the M sub-bands, a downmixed signal and the residual signal of each of the M sub-bands are encoded.

When it is determined not to encode the residual signal of each of the M sub-bands, a downmixed signal of each of the M sub-bands is encoded.

In an implementation, as an example instead of a limitation, the M sub-bands are M sub-bands whose sub-band index numbers are less than a preset maximum sub-band index number in the N sub-bands. That is, the M sub-bands are sub-bands with comparatively low frequencies in the N sub-bands, to be specific, frequencies of the M sub-bands are lower than frequencies of N−M sub-bands in the N sub-bands other than the M sub-bands.

Further, different maximum sub-band index numbers are preset based on different coding rates such that M sub-bands whose sub-band index numbers are less than or equal to the preset maximum sub-band index number are selected from the N sub-bands based on the preset maximum sub-band index number, and the residual signal encoding parameter of the current frame is determined based on the M sub-bands.

For example, when the coding rate is 26 kbps, N=10, M=5, and the preset maximum sub-band index number is set to 4, it indicates that the residual signal encoding parameter of the current frame is determined based on five sub-bands whose sub-band index numbers are 0 to 4 in the 10 sub-bands.

For another example, when the coding rate is 44 kbps, N=12, M=6, and the preset maximum sub-band index number is set to 5, it indicates that the residual signal encoding parameter of the current frame is determined based on six sub-bands whose sub-band index numbers are 0 to 5 in the 12 sub-bands.

For another example, when the coding rate is 56 kbps, N=12, M=7, and the preset maximum sub-band index number is set to 6, it indicates that the residual signal encoding parameter of the current frame is determined based on seven sub-bands whose sub-band index numbers are 0 to 6 in the 12 sub-bands.

In another implementation, for different coding rates, maximum sub-band index numbers and minimum sub-band index numbers of M sub-bands at different coding rates may be preset such that M sub-bands whose sub-band index numbers are greater than or equal to the preset minimum sub-band index number and less than or equal to the preset maximum sub-band index number are selected from the N sub-bands based on the preset maximum sub-band index number and the preset minimum sub-band index number, and the residual signal encoding parameter of the current frame is determined based on the M sub-bands.

For example, when the coding rate is 26 kbps, N=10, M=4, the preset minimum sub-band index number is set to 4, and the preset maximum sub-band index number is set to 7, it indicates that the residual signal encoding parameter of the current frame is determined based on four sub-bands whose sub-band index numbers are 4 to 7 in the 10 sub-bands.

As an example instead of a limitation, the determining, based on the residual signal encoding parameter of the current frame, whether to encode the residual signal of each of the M sub-bands includes determining, based on a comparison result between the residual signal encoding parameter of the current frame and a preset first threshold, whether to encode the residual signal of each of the M sub-bands, where the first threshold is greater than 0 and less than 1.0, and when the residual signal encoding parameter of the current frame is less than or equal to the first threshold, determining not to encode the residual signal of each of the M sub-bands, or when the residual signal encoding parameter is greater than the first threshold, determining to encode the residual signal of each of the M sub-bands.

Further, the encoder side compares the residual signal encoding parameter of the current frame with the preset first threshold, and when the residual signal encoding parameter of the current frame is greater than the first threshold, determines to encode the residual signal of each of the M sub-bands, or when the residual signal encoding parameter of the current frame is less than or equal to the first threshold, determines not to encode the residual signal of each of the M sub-bands.

For example, in an implementation, the first threshold is 0.075. If a value of the residual signal encoding parameter of the current frame is 0.06, the encoder side does not encode the residual signal of each of the M sub-bands.

It should be understood that the value of the first threshold is merely an example, and the first threshold may alternatively be another value greater than 0 and less than 1.0. For example, the first threshold is 0.55, 0.46, 0.86, or 0.9.

In another optional implementation, the encoder side may further indicate the comparison result between the residual signal encoding parameter of the current frame and the first threshold using 0 or 1. For example, 0 indicates that the residual signal of each of the M sub-bands is not to be encoded, and 1 indicates that the residual signal of each of the M sub-bands is to be encoded. Certainly, 1 may alternatively be used to indicate that the residual signal of each of the M sub-bands is not to be encoded, and 0 may alternatively be used to indicate that the residual signal of each of the M sub-bands is to be encoded.

The following uses an example in which the M sub-bands are sub-bands whose sub-band index numbers are less than or equal to the preset maximum sub-band index number (for example, the maximum sub-band index number is M−1) to describe in detail a method in which the encoder side determines the residual signal encoding parameter of the current frame.

Method 1:

The encoder side determines the residual signal encoding parameter of the current frame based on the downmixed signal energy, the residual signal energy, and a side gain of each of the M sub-bands.

In a possible implementation, the encoder side determines a first parameter based on the downmixed signal energy, the residual signal energy, and the side gain of each of the M sub-bands, where the first parameter indicates a value relationship between the downmixed signal energy and the residual signal energy of each of the M sub-bands, determines a second parameter based on the downmixed signal energy and the residual signal energy of each of the M sub-bands, where the second parameter indicates a value relationship between a first energy sum and a second energy sum, the first energy sum is a sum of residual signal energy and downmixed signal energy of the M sub-bands, the second energy sum is a sum of residual signal energy and downmixed signal energy of M sub-bands in a frequency-domain signal of a previous frame of the current frame, and the M sub-bands of the current frame have the same sub-band index numbers as the M sub-bands of the previous frame, and finally determines the residual signal encoding parameter of the current frame based on the first parameter, the second parameter, and a long-term smoothing parameter of the previous frame of the current frame.

Further, when determining the first parameter, the encoder side determines M energy parameters based on the downmixed signal energy, the residual signal energy, and the side gain of each of the M sub-bands, where the M energy parameters each indicate a value relationship between downmixed signal energy and residual signal energy of one of the M sub-bands respectively, and the M energy parameters one-to-one correspond to the M sub-bands, and the encoder side finally determines an energy parameter with a largest value in the M energy parameters as the first parameter.

Optionally, an energy parameter of a sub-band whose sub-band index number is b in the M energy parameters may be determined using the following function:

$$\text{res\_dmx\_ratio}[b]=f(g(b),\text{res\_cod\_NRG\_M}[b],\text{res\_cod\_NRG\_S}[b]), \quad (1)$$

where res_dmx_ratio[b] represents the energy parameter of the sub-band whose sub-band index number is b in the M energy parameters, b is greater than or equal to 0 and is less than or equal to the preset maximum sub-band index number, res_cod_NRG_S[b] represents residual signal energy of the sub-band whose sub-band index number is b, res_cod_NRG_M[b] represents downmixed signal energy of the sub-band whose sub-band index number is b, and g(b) represents a function of a side gain side_gain[b] of the sub-band whose sub-band index number is b.

Further, in an implementation, the energy parameter of the sub-band whose sub-band index number is b in the M energy parameters meets a formula:

$$\text{res\_dmx\_ratio}[b]=\text{res\_cod\_NRG\_S}[b]/(\text{res\_cod\_NRG\_S}[b]+(1-g(b))\cdot(1-g(b))\cdot\text{res\_cod\_NRG\_M}[b]+1) \quad (2)$$

The first parameter is denoted as res_dmx_ratio, and res_dmx_ratio meets:

$$\text{res\_dmx\_ratio}=\max(\text{res\_dmx\_ratio}[0],\text{res\_dmx\_ratio}[1],\text{res\_dmx\_ratio}[M-1]). \quad (3)$$

When determining the second parameter, the encoder side first separately determines a sum of residual signal energy of the M sub-bands and a sum of downmixed signal energy of the M sub-bands, and denotes the sum of downmixed signal energy of the M sub-bands as dmx_nrg_all_curr and the sum of residual signal energy of the M sub-bands as res_nrg_all_curr.

Optionally, the sum dmx_nrg_all_curr of the downmixed signal energy of the M sub-bands meets:

$$\text{dmx\_nrg\_all\_curr} = \sum_{b=0}^{b=M-1} \left( \gamma_1 \cdot \text{res\_cod\_NRG\_M}[b] + (1-\gamma_1) \cdot \text{res\_cod\_NRG\_M\_prev}[b] \right), \quad (4)$$

where res_cod_NRG_M_prev[b] represents downmixed signal energy of a sub-band whose sub-band index number is b in the previous frame of the current frame, $\gamma_1$ represents a smoothing factor, and $\gamma_1$ is a real number greater than or equal to 0 and less than or equal to 1, for example, $\gamma_1=0.1$.

It should be understood that the value of $\gamma_1$ is merely an example, and the value of $\gamma_1$ may alternatively be another value greater than or equal to 0 and less than or equal to 1. For example, $\gamma_1$ is 0.3, 0.5, 0.6, or 0.8.

Optionally, the sum res_nrg_all_curr of the residual signal energy of the M sub-bands meets:

$$\text{res\_nrg\_all\_curr} = \sum_{b=0}^{b=M-1} \left( \gamma_2 \cdot \text{res\_cod\_NRG\_S}[b] + (1-\gamma_2) \cdot \text{res\_cod\_NRG\_S\_prev}[b] \right), \quad (5)$$

where res_cod_NRG_S_prev[b] represents residual signal energy of a sub-band whose sub-band index number is b in the previous frame of the current frame, $\gamma_2$ represents a smoothing factor, and $\gamma_2$ is a real number greater than or equal to 0 and less than or equal to 1, for example, $\gamma_2=0.1$.

It should be understood that the value of $\gamma_2$ is merely an example, and the value of $\gamma_2$ may alternatively be another value greater than or equal to 0 and less than or equal to 1. For example, $\gamma_2$ is 0.2, 0.5, 0.7, or 0.9.

The encoder side determines the sum (namely, the first energy sum) of the downmixed signal energy and the residual signal energy of the M sub-bands of the current frame based on dmx_nrg_all_curr and res_nrg_all_curr. The first energy sum is denoted as dmx_res_all.

Optionally, dmx_res_all meets:

$$\text{dmx\_res\_all}=\text{res\_nrg\_all\_curr}+\text{dmx\_nrg\_all\_curr}. \quad (6)$$

The encoder side may further determine the sum (namely, the second energy sum) of the residual signal energy and the downmixed signal energy of the M sub-bands in the frequency-domain signal of the previous frame of the current frame, where the M sub-bands of the previous frame of the current frame have the same sub-band index numbers as the M sub-bands of the current frame. The second energy sum is denoted as dmx_res_all_prev.

For the determining of the second energy sum dmx_res_all_prev, refer to the foregoing method for determining the first energy sum dmx_res_all. For brevity, details are not described herein again.

After determining the first energy sum and the second energy sum, the encoder side may determine the second parameter based on the first energy sum and the second energy sum.

Optionally, the second parameter is an inter-frame energy fluctuation ratio, and the inter-frame energy fluctuation ratio is denoted as frame_nrg_ratio.

Optionally, in an implementation, the inter-frame energy fluctuation ratio frame_nrg_ratio meets:

$$\text{frame\_nrg\_ratio}=\text{dmx\_res\_all}/\text{dmx\_res\_all\_prev}. \quad (7)$$

Optionally, in another implementation, the inter-frame energy fluctuation ratio frame_nrg_ratio meets:

$$\text{frame\_nrg\_ratio}=\min(5.0,\max(0.2,\text{dmx\_res\_all}/\text{dmx\_res\_all\_prev})). \quad (8)$$

The max function is used to return a larger value in a given parameter (0.2, frame_nrg_ratio_prev), and the min function is used to return a minimum value in a given parameter (5.0, max (0.2, frame_nrg_ratio_prev)). Compared with the formula (7), the formula (8) further has a correction operation such that frame_nrg_ratio determined using the formula (8) can better reflect an inter-frame energy fluctuation between the current frame and the previous frame.

After determining the first parameter and the second parameter, the encoder side may determine the residual signal encoding parameter of the current frame based on the first parameter, the second parameter, and the long-term smoothing parameter of the previous frame of the current frame.

As an example instead of a limitation, the residual signal encoding parameter of the current frame may be a long-term smoothing parameter of the current frame. That is, the encoder side may determine the long-term smoothing parameter of the current frame based on the first parameter, the second parameter, and the long-term smoothing parameter of the previous frame of the current frame, and then compare the long-term smoothing parameter of the current frame with the preset first threshold in order to determine whether to encode the residual signal of each of the M sub-bands.

For example, the long-term smoothing parameter of the current frame meets a formula:

$$\text{res\_dmx\_ratio\_lt} = \text{res\_dmx\_ratio} \cdot \alpha + \text{res\_dmx\_ratio\_lt\_prev} \cdot (1-\alpha), \quad (9)$$

where res_dmx_ratio_lt represents the long-term smoothing parameter of the current frame, res_dmx_ratio represents the first parameter, res_dmx_ratio_lt_prev represents the long-term smoothing parameter of the previous frame of the current frame, and $0 < \alpha < 1$.

When res_dmx_ratio_lt is calculated according to the formula (9), when a value of the first parameter and/or a value of the second parameter change/changes, a value of the parameter a in the formula (9) may also change accordingly. That is, as the value of the first parameter and/or the value of the second parameter change/changes, a weight of the long-term smoothing parameter of the previous frame of the current frame in the formula (9) may also change accordingly.

For example, when the second parameter is greater than a preset third threshold, a value of a when the first parameter is less than a preset second threshold is greater than a value of a when the first parameter is greater than or equal to the preset second threshold, the second threshold is greater than or equal to 0 and less than or equal to 0.6, and the third threshold is greater than or equal to 2.7 and less than or equal to 3.7, or when the second parameter is less than a preset fifth threshold, a value of a when the first parameter is greater than a preset fourth threshold is greater than a value of a when the first parameter is less than or equal to the preset fourth threshold, the fourth threshold is greater than or equal to 0 and less than or equal to 0.9, and the fifth threshold is greater than or equal to 0 and less than or equal to 0.71, or a value of a when the first parameter is less than a preset second threshold and the second parameter is greater than a preset third threshold is greater than a value of a when the second parameter is greater than or equal to a preset fifth threshold and is less than or equal to the preset third threshold, the second threshold is greater than or equal to 0 and less than or equal to 0.6, the third threshold is greater than or equal to 2.7 and less than or equal to 3.7, and the fifth threshold is greater than or equal to 0 and less than or equal to 0.71.

For example, a value of the second threshold may be 0.1, and a value of the third threshold may be 3.2, to be specific, when the second parameter frame_nrg_ratio is greater than 3.2, a value of a when the first parameter res_dmx_ratio is less than 0.1 is greater than a value of a when res_dmx_ratio is greater than or equal to 0.1, or a value of the fourth threshold may be 0.4, and a value of the fifth threshold may be 0.21, to be specific, when frame_nrg_ratio is less than 0.21, a value of a when res_dmx_ratio is greater than 0.4 is greater than a value of a when res_dmx_ratio is less than or equal to 0.4, or a value of the second threshold may be 0.1, a value of the third threshold may be 3.2, and a value of the fifth threshold may be 0.21, to be specific, a value of a when res_dmx_ratio is less than 0.1 and frame_nrg_ratio is greater than 3.2 is greater than a value of a when frame_nrg_ratio is greater than or equal to 0.21 and less than or equal to 3.2, or a value of the fourth threshold may be 0.4, and a value of the fifth threshold may be 0.21, to be specific, a value of a when res_dmx_ratio is greater than 0.4 and frame_nrg_ratio is less than 0.21 is greater than a value of a when frame_nrg_ratio is greater than or equal to 0.21 and less than or equal to 3.2.

Further, for example, when res_dmx_ratio is less than 0.1 and frame_nrg_ratio is greater than 3.2, a value of $\alpha$ is 0.5, or when frame_nrg_ratio is greater than or equal to 0.21 and less than or equal to 3.2, a value of $\alpha$ is 0.1.

It should be noted that the listed values of the second threshold to the fifth threshold and the value of a are merely examples for description, and do not constitute any limitation to this application. The values of the second threshold to the fifth threshold and the value of a may alternatively be other values in a given interval.

It should be further noted that, when the current frame is the first frame processed by the encoder side, the current frame does not have a previous frame. In this case, when the long-term smoothing parameter of the current frame is determined, the long-term smoothing parameter of the previous frame of the current frame in the foregoing formula is a preset long-term smoothing parameter. As an example instead of a limitation, a value of the preset long-term smoothing parameter may be 1.0, or certainly, may be another value such as 0.9 or 1.1.

Method 2:

A method for determining the residual signal encoding parameter in Method 2 is similar to that in Method 1, and a difference lies in that a method for determining the first parameter differs. Therefore, reference may be made to the related description of determining the residual signal encoding parameter in Method 1. For brevity, only the method for determining the first parameter in Method 2 is described herein.

As an example instead of a limitation, the encoder side determines the first parameter based on the downmixed signal energy and the residual signal energy of each of the M sub-bands, where the first parameter indicates a value relationship between the downmixed signal energy and the residual signal energy of each of the M sub-bands.

Further, when determining the first parameter, the encoder side determines M energy parameters based on the downmixed signal energy and the residual signal energy of each of the M sub-bands, where the M energy parameters each indicate a value relationship between downmixed signal energy and residual signal energy of one of the M sub-bands respectively, and the M energy parameters one-to-one correspond to the M sub-bands, and the encoder side finally determines an energy parameter with a largest value in the M energy parameters as the first parameter.

Optionally, an energy parameter of a sub-band whose sub-band index number is b in the M energy parameters determined by the encoder side may be determined using the following function:

$$\text{res\_dmx\_ratio}[b] = f(\text{res\_cod\_NRG\_}M[b], \text{res\_cod\_NRG\_}S[b]), \quad (10)$$

where res_dmx_ratio[b] represents the energy parameter of the sub-band whose sub-band index number is b in the M energy parameters, b is greater than or equal to 0 and is less than or equal to the preset maximum sub-band index number, res_cod_NRG_S[b] represents residual signal energy of the sub-band whose sub-band index number is b, and res_cod_NRG_M[b] represents downmixed signal energy of the sub-band whose sub-band index number is b.

For example, the energy parameter of the sub-band whose sub-band index number is b in the M energy parameters meets a formula:

$$\text{res\_dmx\_ratio}[b] = \text{res\_cod\_NRG\_}S[b] / \text{res\_cod\_NRG\_}M[b]. \quad (11)$$

The first parameter is denoted as res_dmx_ratio, and res_dmx_ratio meets:

res_dmx_ratio=max(res_dmx_ratio[0],res_dmx_ratio[1],res_dmx_ratio[M−1]).  (12)

After determining the first parameter, the encoder side may determine a second parameter according to the method described in Method 1, finally determine the residual signal encoding parameter according to the method described in Method 1, and determine, based on the residual signal encoding parameter, whether to encode the residual signal of each of the M sub-bands.

Method 3:

A method for determining the residual signal encoding parameter in Method 3 is similar to that in Method 1, and a difference lies in that a method for determining the first parameter differs. Therefore, reference may be made to the related description of determining the residual signal encoding parameter in Method 1. For brevity, only the method for determining the first parameter in Method 3 is described herein.

As an example instead of a limitation, the encoder side determines the first parameter based on the downmixed signal energy and the residual signal energy of each of the M sub-bands, corrects the first parameter, and determines, as a final first parameter, a first parameter obtained through correction, where the first parameter indicates a value relationship between the downmixed signal energy and the residual signal energy of each of the M sub-bands.

Further, when determining the first parameter, the encoder side determines M energy parameters based on the downmixed signal energy and the residual signal energy of each of the M sub-bands, where the M energy parameters each indicate a value relationship between downmixed signal energy and residual signal energy of one of the M sub-bands respectively, and the M energy parameters one-to-one correspond to the M sub-bands, and the encoder side determines a sum of the M energy parameters as the first parameter.

Optionally, an energy parameter of a sub-band whose sub-band index number is b in the M energy parameters determined by the encoder side may be determined using the function (1).

For example, the energy parameter of the sub-band whose sub-band index number is b in the M energy parameters meets the formula (2).

Optionally, the energy parameter of the sub-band whose sub-band index number is b in the M energy parameters determined by the encoder side may be determined using the function (11).

For example, the energy parameter of the sub-band whose sub-band index number is b in the M energy parameters meets the formula (11).

For example, the first parameter $\text{res\_dmx\_ratio}_1$ determined by the encoder side based on the M energy parameters meets:

$$\text{res\_dmx\_ratio}_1 = \sum_{b=0}^{M-1} \text{res\_dmx\_ratio}[b]. \quad (13)$$

In addition, the encoder side may further determine a maximum value res_dmx_ratio max in the M energy parameters, and res_dmx_ratio max meets the formula (12).

The encoder side corrects $\text{res\_dmx\_ratio}_1$ based on res_dmx_ratio max and the downmixed signal energy res_cod_NRG_M[b] of each of the M sub-bands, and determines $\text{res\_dmx\_ratio}_2$ obtained through correction.

For example, the encoder side corrects $\text{res\_dmx\_ratio}_1$ according to the following formula, where M=5, and $\text{res\_dmx\_ratio}_2$ obtained through correction meets:

$$\text{res\_dmx\_ratio}_2 = \quad (14)$$

(res_dmx_ratio_max > 0.32||(res_cod_NRG_M[0] + res_cod_NRG_M[1] + res_cod_NRG_M[2]) >

512.0 · (res_cod_NRG_M[3] + res_cod_NRG_M[4]))?

res_dmx_ratio_max:res_dmx_ratio · 0.2.

Optionally, $\text{res\_dmx\_ratio}_2$ obtained through correction may be further corrected.

For example, $\text{res\_dmx\_ratio}_3$ finally obtained through correction meets:

$$\text{res\_dmx\_ratio}_3 = \text{pow}(\text{res\_dmx\_ratio}_2, 1.2), \quad (15)$$

where a pow( ) function represents an exponential function, and pow($\text{res\_dmx\_ratio}_2$,1.2) represents the 1.2 power of $\text{res\_dmx\_ratio}_2$.

After determining the first parameter obtained through correction ($\text{res\_dmx\_ratio}_3$ obtained through correction), the encoder side may determine a second parameter according to the method described in Method 1, finally determine the residual signal encoding parameter according to the method described in Method 1, and determine, based on the residual signal encoding parameter, whether to encode the residual signal of each of the M sub-bands.

Method 4:

A method for determining the residual signal encoding parameter in Method 4 is similar to that in Method 1, and a difference lies in that a method for determining the first parameter differs. Therefore, reference may be made to the related description of determining the residual signal encoding parameter in Method 1. For brevity, only the method for determining the first parameter in Method 4 is described herein.

As an example instead of a limitation, the encoder side determines the first parameter based on a sum of residual signal energy of the M sub-bands and a sum of downmixed signal energy of the M sub-bands.

Further, the encoder side separately determines the sum dmx_nrg_all_curr of the downmixed signal energy of the M sub-bands and the sum res_nrg_all_curr of the residual signal energy of the M sub-bands, and determines the first parameter based on dmx_nrg_all_curr and res_nrg_all_curr.

Optionally, the sum dmx_nrg_all_curr of the downmixed signal energy of the M sub-bands meets the formula (4).

Optionally, the sum res_nrg_all_curr of the residual signal energy of the M sub-bands meets the formula (5).

The encoder side determines the first parameter res_dmx_ratio based on dmx_nrg_all_curr and res_nrg_all_curr.

For example, the first parameter res_dmx_ratio finally determined by the encoder side meets:

res_dmx_ratio=res_nrg_all_curr/dmx_nrg_all_curr.  (16)

After determining the first parameter, the encoder side may determine a second parameter according to the method described in Method 1, finally determine the residual signal encoding parameter according to the method described in Method 1, and determine, based on the residual signal encoding parameter, whether to encode the residual signal of each of the M sub-bands.

Figure 7:
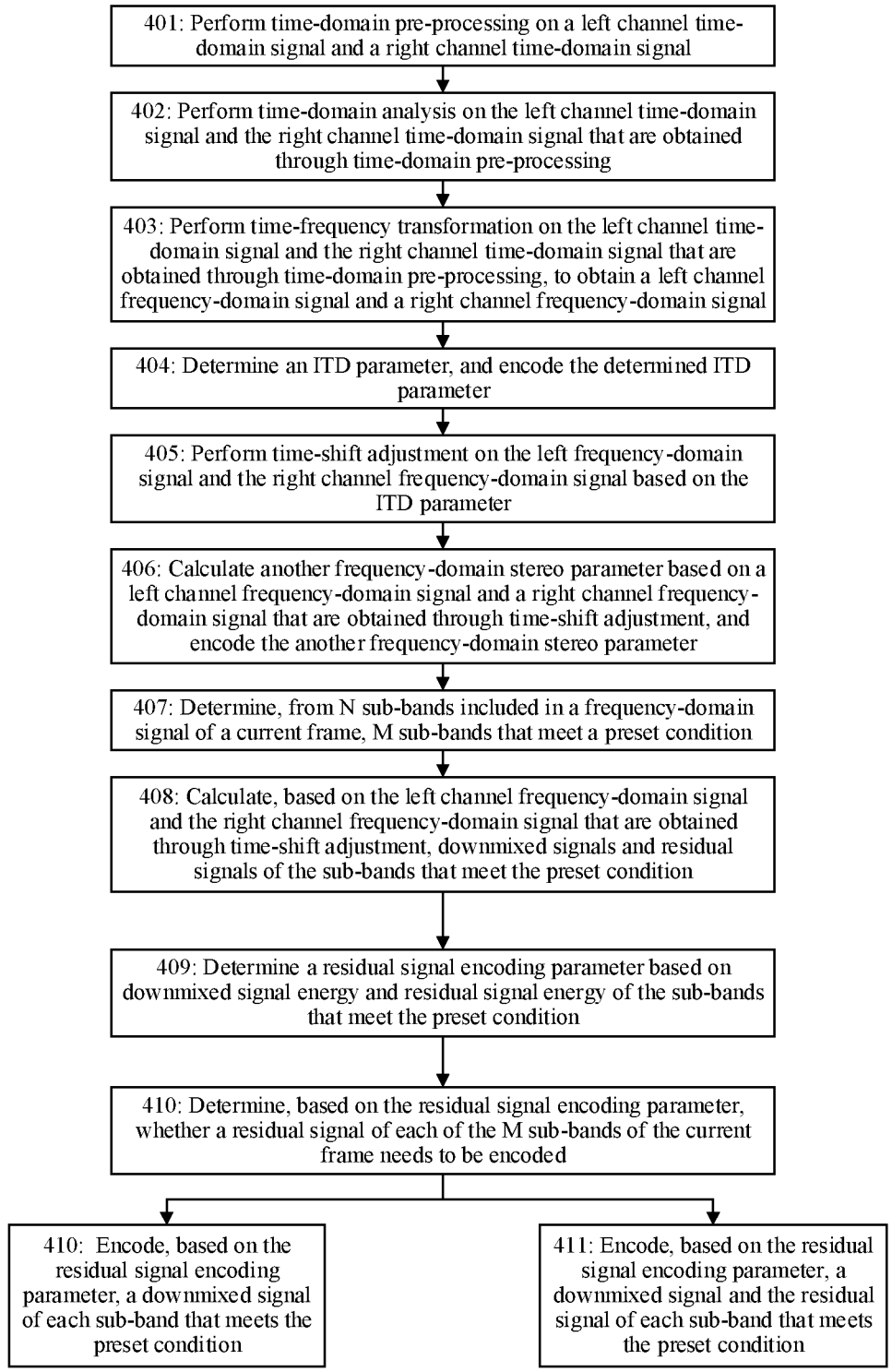
FIG. 7 is another schematic flowchart of a stereo signal encoding method according to an embodiment of this application.

To better understand an entire encoding process of a stereo signal, the following also uses a wideband stereo signal with a signal length of each frame being 20 ms as an example, and uses a frame (for example, a current frame) that is being processed by an encoder side as an example, and the stereo signal encoding method 300 in this embodiment of this application is described with reference to FIG. 7. The stereo signal encoding method shown in FIG. 7 includes at least the following steps.

401: Perform time-domain pre-processing on a left channel time-domain signal and a right channel time-domain signal, to obtain a left channel time-domain signal and a right channel time-domain signal that are obtained through time-domain pre-processing.

Further, a signal length of a current frame is 20 ms. If a sampling frequency is 16 kilohertz (kHz), after sampling, a frame length of the current frame H=320, that is, the current frame includes 320 sampling points.

A stereo signal of the current frame includes a left channel time-domain signal of the current frame and a right channel time-domain signal of the current frame. The left channel time-domain signal of the current frame is denoted as $x_L(n)$, and the right channel time-domain signal of the current frame is denoted as $x_R(n)$. n represents a sampling point sequence number, where =0, 1, ..., H−1. The left channel time-domain signal and the right channel time-domain signal may be referred as left and right channel time-domain signals.

The performing time-domain pre-processing on a left channel time-domain signal and a right channel time-domain signal of the current frame may include respectively performing high-pass filtering processing on the left channel time-domain signal and the right channel time-domain signal of the current frame to obtain a left channel time-domain signal and a right channel time-domain signal of the current frame that are obtained through time-domain pre-processing. The left channel time-domain signal of the current frame that is obtained through pre-processing is denoted as $x_{L\_HP}(n)$ and the right channel time-domain signal of the current frame that is obtained through pre-processing is denoted as $x_{R\_HP}(n)$ n represents a sampling point sequence number, where n=0, 1, ..., H−1. The left channel time-domain signal of the current frame that is obtained through time-domain pre-processing and the right channel time-domain signal of the current frame that is obtained through time-domain pre-processing may be referred to as left and right channel time-domain signals of the current frame that are obtained through time-domain pre-processing. During high-pass filtering processing, an infinite impulse response (IIR) digital filter whose cut-off frequency is 20 hertz (Hz) may be used, or a filter of another type may be used.

For example, when a sampling rate of the stereo signal is 16 kHz, a corresponding transfer function of the high-pass filter whose cut-off frequency is 20 Hz may be:

$$H_{20Hz}(z) = \frac{b_0 + b_1 z^{-1} + b_2 z^{-2}}{1 + a_1 z^{-1} + a_2 z^{-2}}, \quad (17)$$

where $b_0$=0.994461788958195, $b_1$=−1.988923577916390, $b_2$=0.994461788958195, $a_1$=1.98892905899653, $a_2$=−0.988954249933127, and z represents a transformation factor of Z-transform. A corresponding time-domain filter is:

$x_{L\_HP}(n)=b_0 \cdot x_L(n)+b_1 \cdot x_L(n-1)+b_2 \cdot x_L(n-2)-a_1 \cdot x_{L\_HP}(n-1)-a_2 \cdot x_{L\_HP}(n-2).$ (18)

402: Perform time-domain analysis on the left channel time-domain signal and the right channel time-domain signal that are obtained through time-domain pre-processing.

Further, the time-domain analysis may include transient detection and the like. The transient detection may be separately performing energy detection on the left channel time-domain signal and the right channel time-domain signal of the current frame that are obtained through pre-processing in order to detect whether an energy burst occurs in the current frame.

For example, energy $E_{cur\_L}$ of the left channel time-domain signal of the current frame that is obtained through pre-processing is calculated. Transient detection is performed based on an absolute value of a difference between energy $E_{pre\_L}$ of a left channel time-domain signal of a previous frame of the current frame that is obtained through pre-processing and the energy $E_{cur\_L}$ of the left channel time-domain signal of the current frame that is obtained through pre-processing, to obtain a transient detection result of the left channel time-domain signal of the current frame that is obtained through pre-processing. Transient detection may be performed, using the same method, on the right channel time-domain signal of the current frame that is obtained through pre-processing.

The time-domain analysis may include other time-domain analysis in the other approaches in addition to the transient detection. For example, the time-domain analysis may include time-domain ITD parameter determining, time-domain delay alignment processing, and band spreading pre-processing.

403: Perform time-frequency transformation on the left channel time-domain signal and the right channel time-domain signal that are obtained through time-domain pre-processing, to obtain a left channel frequency-domain signal and a right channel frequency-domain signal.

Further, discrete Fourier transform may be performed on the left channel time-domain signal that is obtained through time-domain pre-processing, to obtain the left channel frequency-domain signal, and discrete Fourier transform is performed on the right channel time-domain signal that is obtained through time-domain pre-processing, to obtain the right channel frequency-domain signal.

To overcome a problem of spectral aliasing, an overlap-add method may be used for processing between two consecutive times of discrete Fourier transform, and sometimes, zero may be added to an input signal of discrete Fourier transform.

Discrete Fourier transform may be performed once for each frame, or each frame of signal may be divided into P (P is a positive integer greater than or equal to 2) subframes, and discrete Fourier transform is performed once for each subframe.

For example, discrete Fourier transform is performed once for the current frame, a left channel frequency-domain signal of the current frame for which discrete Fourier transform is performed is denoted as L(k), and a right channel frequency-domain signal of the current frame for which discrete Fourier transform is performed is denoted as R(k). k represents a frequency bin index number, where k=0, 1, ..., L−1, and L represents a frame length of the current frame for which discrete Fourier transform is performed, that is, the current frame for which discrete Fourier transform is performed includes L frequency bins.

For another example, a current frame is divided into P subframes, where P is a positive integer greater than or equal to 2. A left channel frequency-domain signal of a subframe whose index number is i and for which discrete Fourier transform is performed is denoted as $L_i(k)$, a right channel frequency-domain signal of the subframe whose index number is i and for which discrete Fourier transform is performed is denoted as $R_i(k)$. i represents a subframe index number, where i=0, 1, ..., P−1, k represents a frequency bin index number, where k=0, 1, ..., L−1, and L represents a frame length of each subframe for which discrete Fourier transform is performed, that is, each subframe for which discrete Fourier transform is performed includes L frequency bins.

404: Determine an ITD parameter, and encode the determined ITD parameter.

Further, there are a plurality of methods for determining the ITD parameter. The ITD parameter may be determined only in frequency domain, or may be determined only in time domain, or may be determined in time-frequency domain. This is not limited in this application.

The ITD parameter may be extracted in time domain using a cross-correlation coefficient. For example, in a range of $0 \leq i \leq T_{max}$, $$c_n(i) = \sum_{j=0}^{H-1-i} x_{R\_HP}(j) \cdot x_{L\_HP}(j+i) \text{ and}$$

$$c_p(i) = \sum_{j=0}^{H-1-i} x_{L\_HP}(j) \cdot x_{R\_HP}(j+i)$$

are calculated.

If $$\max_{0 \leq i \leq T_{max}} (c_n(i)) > \max_{0 \leq i \leq T_{max}} (c_p(i)),$$

an ITD parameter value is an opposite number of an index number corresponding to $\max(c_n(i))$. If $$\max_{0 \leq i \leq T_{max}} (c_n(i)) \leq \max_{0 \leq i \leq T_{max}} (c_p(i)),$$

an ITD parameter value is an index number corresponding to $\max(c_p(i))$. i represents an index number for calculating the cross-correlation coefficient, j represents an index number of a sampling point, $T_{max}$ is corresponding to a maximum value of ITD parameter values at different sampling rates, and H represents the frame length of the current frame.

The ITD parameter may alternatively be determined in frequency domain based on the left channel frequency-domain signal and the right channel frequency-domain signal. For example, time-frequency transformation technologies such as discrete Fourier transform (DFT), fast Fourier transform (FFT), and modified discrete cosine transform (MDCT) may be used to transform a time-domain signal into a frequency-domain signal.

In this embodiment of this application, the left channel frequency-domain signal of the subframe whose index number is i and for which discrete Fourier transform is performed is denoted as $L_i(k)$, where k=0, 1, ..., L/2−1, and the right channel frequency-domain signal of the subframe whose index number is i and for which transform is performed is denoted as $R_i(k)$, where k=0, 1, ..., L/2−1 and i=0, 1, ..., P−1. A frequency-domain cross-correlation coefficient of the subframe whose index number is i is calculated according to $XCORR_i(k) = L_i(k) \cdot R^*_i(k)$, where $R^*_i(k)$ represents a conjugation of a right channel frequency-domain signal of an $i^{th}$ subframe for which transform is performed.

The frequency-domain cross-correlation coefficient is converted into time-domain $xcorr_i(n)$, where n=0,1, ..., L−1, and a maximum value of $xcorr_i(n)$ is searched in a range $L/2−T_{max} \leq n \leq L/2+T_{max}$, to obtain that an ITD parameter value of the subframe whose index number is i is $$T_i = \arg \max_{L/2-T_{max} \leq n \leq L/2+T_{max}} (xcorr_i(n)) - \frac{L}{2}.$$

In addition, an amplitude value may further be calculated according to $$mag(j) = \sum_{i=0}^{1} \sum_{k=0}^{L/2-1} L_i(k) \cdot R_i(k) \cdot \exp\left(\frac{2\pi \cdot k \cdot j}{L}\right)$$

in a search range $-T_{max} \leq j \leq T_{max}$ based on the left channel frequency-domain signal and the right channel frequency-domain signal of the subframe whose index number is i and for which DFT transform is performed, and the ITD parameter value is $$T = \arg \max_{-T_{max} \leq j \leq T_{max}} (mag(j)),$$

to be specific, the ITD parameter value is an index number corresponding to a maximum amplitude value.

After the ITD parameter is determined, the ITD parameter may be encoded to obtain an encoding parameter, and the encoding parameter is written into a stereo encoded bitstream.

405: Perform time-shift adjustment on the left frequency-domain signal and the right channel frequency-domain signal based on the ITD parameter.

Further, time-shift adjustment may be performed on the left channel frequency-domain signal and the right channel frequency-domain signal according to any technology. This is not limited in this embodiment of this application.

For example, a current frame of signal is divided into P subframes, where P is a positive integer greater than or equal to 2. A left channel frequency-domain signal, obtained through time-shift adjustment, of a subframe whose index number is i may be denoted as $L_i'(k)$, where k=0,1, ..., L/2−1, and a right channel frequency-domain signal, obtained through time-shift adjustment, of the subframe whose index number is i may be denoted as $R_i'(k)$, k represents a frequency bin index number, where k=0, 1, ..., L/2−1, and i represents a subframe index number, where i=0,1, ..., P−1, and further:

$$L_i'(k) = L_i(k) \cdot e^{-j2\pi \frac{T_j}{L}} \quad (19)$$

$$R_i'(k) = R_i(k) \cdot e^{+j2\pi \frac{T_j}{L}}.$$

$T_i$ represents an ITD parameter value of the subframe whose index number is i, L represents a length of a subframe for which discrete Fourier transform is performed, $L_i(k)$ represents a left channel frequency-domain signal of an $i^{th}$ subframe whose index number is i and for which transform is performed, and $R_i(k)$ represents a right channel frequency-domain signal of the subframe whose index number is i and for which transform is performed, and i represents a subframe index number, where i=0, 1, ..., P−1.

406: Calculate another frequency-domain stereo parameter based on a left channel frequency-domain signal and a right channel frequency-domain signal that are obtained through time-shift adjustment, and encode the other frequency-domain stereo parameter.

Further, the other frequency-domain stereo parameter may include but is not limited to an inter-channel phase difference (IPD) parameter, and/or an inter-channel level difference (ILD) parameter, and/or a sub-band side gain, and/or the like. The ILD may also be referred to as an inter-channel amplitude difference.

After the other frequency-domain stereo parameter is obtained through calculation, the other frequency-domain stereo parameter may be encoded to obtain an encoding parameter, and the encoding parameter is written into the stereo encoded bitstream.

407: Determine, from N sub-bands included in a frequency-domain signal of the current frame, M sub-bands that meet a preset condition.

Further, a frequency-domain signal, obtained through time-shift adjustment, of the current frame is divided into sub-bands. For example, the frequency-domain signal of the current frame is divided into N (N is a positive integer greater than or equal to 2) sub-bands, and a frequency bin included in a sub-band whose sub-band index number is b is k∈[band_limits(b), band_limits(b+1)−1], where band_limits(b) represents a minimum index number of frequency bins included in the sub-band whose sub-band index number is b, and band_limits(b+1) represents a minimum index number of frequency bins included in a sub-band whose sub-band index number is b+1. According to a preset condition, the M sub-bands that meet the preset condition are determined from the N sub-bands.

For example, the preset condition may be that a sub-band index number is less than or equal to a preset maximum sub-band index number, that is, b≤res_cod_band_max, where res_cod_band_max represents the preset maximum sub-band index number.

The preset condition may alternatively be that a sub-band index number is less than or equal to a preset maximum sub-band index number and is greater than or equal to a preset minimum sub-band index number, that is, res_cod_band_min≤b≤res_cod_band_max, where res_cod_band_max represents the preset maximum sub-band index number, and res_cod_band_min represents the preset minimum sub-band index number.

Further, for a wideband stereo signal, different preset conditions may be set based on different coding rates. For example, when the coding rate is 26 kbps, the preset condition may be a sub-band index number b≤5, that is, the preset maximum sub-band index number is 5. When the coding rate is 44 kbps, the preset condition may be a sub-band index number b≤6, that is, the preset maximum sub-band index number is 6. When the coding rate is 56 kbps, the preset condition may be a sub-band index number b≤7, that is, the preset maximum sub-band index number is 7.

For example, if the preset condition is a sub-band index number b≤4, five sub-bands whose index numbers are 0 to 4 may be determined from the N sub-bands of the current frame as sub-bands that meet the preset condition.

In addition, if the current frame is divided into P sub-frames (P is a positive integer greater than or equal to 2), each subframe that is obtained through time-shift adjustment is divided into sub-bands. For example, a subframe whose index number is i (i=0, 1, ..., P−1) is divided into N sub-bands, a frequency bin included in a sub-band whose index number is b in the subframe whose index number is i is $k_i$∈[band_limits(b), band_limits(b+1)−1], where band_limits(b) represents a minimum index number of frequency bins included in the sub-band whose index number is b in the subframe whose index number is i, and band_limits(b+1) represents a minimum index number of frequency bins included in a sub-band whose index number is b+1 in the subframe whose index number is i.

According to a preset condition, the M sub-bands that meet the preset condition are determined from N sub-bands included in each frame.

The preset condition may be that an index number of a sub-band is greater than or equal to the preset minimum sub-band index number and is less than or equal to the preset maximum sub-band index number, that is, res_cod_band_min≤b≤res_cod_band_max.

For example, if the preset condition is 4≤b≤8, five sub-bands whose index numbers are 4 to 8 are determined, from the N sub-bands in each subframe, as sub-bands that meet the preset condition.

408: Calculate, based on the left channel frequency-domain signal and the right channel frequency-domain signal that are obtained through time-shift adjustment, downmixed signals and residual signals of the sub-bands that meet the preset condition.

Further, a method for calculating the downmixed signals and the residual signals of the sub-bands that meet the preset condition is described using an example in which the current frame is divided into P subframes (P is a positive integer greater than or equal to 2) (for example, the current frame may be divided into two subframes or four subframes).

For example, if the preset condition is that the sub-band index number b is less than or equal to 5, downmixed signals and residual signals of sub-bands whose index numbers are 0 to 5 in each subframe are calculated.

A downmixed signal of a sub-band whose index number is b (b≤5) in a subframe whose index number is i is denoted as $DMX_i(k)$, and a residual signal of the sub-band whose index number is b in the subframe whose index number is i is denoted as $RES_i'(k)$, where $DMX_i(k)$ and $RES_i'(k)$ meet:

$$DMX_i(k) = \frac{L_i''(k) + R_i''(k)}{2}, \quad (20)$$

$$RES_i'(k) = RES_i(k) - g\_ILD_i \cdot DMX_i(k), \quad (21)$$

$$RES_i(k) = \frac{L_i''(k) - R_i''(k)}{2}, \quad (22)$$

$$\begin{cases} L_i''(k) = L_i'(k) \cdot e^{-j\beta} \\ R_i''(k) = R_i'(k) \cdot e^{-j(IPD(b)-\beta)} \end{cases}, \quad (23)$$

$$\beta = \arctan(\sin(IPD_i(b)), \cos(IPD_i(b)) + 2 \cdot c), \text{ and} \quad (24)$$

$$c = \frac{1 + g\_IDL_i}{1 - g\_ILD_i}. \quad (25)$$

IPD (b) represents an IPD parameter of the sub-band whose index number b is in the subframe whose index number is i, and g_ILD, represents a side gain of the sub-band whose index number is b in the subframe whose index number is i, $L_i'(k)$ represents a left channel frequency-domain signal, obtained through time-shift adjustment, of the sub-band whose index number is b in the subframe whose index number is i, $R_i'(k)$ represents a right channel frequency-domain signal, obtained through time-shift adjustment, of the sub-band whose index number b is in the subframe whose index number is i, $L_i'(k)$ represents a left channel frequency-domain signal, obtained through adjustment of a plurality of stereo parameters, of the sub-band whose index number is b in the subframe whose index number is i, $R_i'(k)$ represents a right channel frequency-domain signal, obtained through adjustment of a plurality of stereo parameters, of the sub-band whose index number is b in the subframe whose index number is i, i represents a subframe index number, where i=0, 1, ..., P−1, k represents a frequency bin index number, where k∈[band_limits(b), band_limits(b+1)−1], band_limits(b) represents a minimum index number of frequency bins included in the sub-band whose index number is b in the subframe whose index number is i, and band_limits(b+1) represents a minimum index number of frequency bins included in a sub-band whose index number is b+1 in the subframe whose index number is i.

For another example, the downmixed signal $DMX_i(k)$ of the sub-band whose index number is b in the subframe whose index number is i may alternatively be calculated according to the following method:

$$DMX_i(k) = [L''(k) + R''(k)] \cdot c, \text{ and} \quad (26)$$

$$c = \sqrt{\frac{1}{2} \cdot \frac{L''(k)^2 + R''(k)^2}{(L''(k) + R''(k))^2}}. \quad (27)$$

$L_i'(k)$ represents a left channel frequency-domain signal, obtained through adjustment of the plurality of stereo parameters, of the sub-band whose index number is b in the subframe whose index number is i, and $R_i'(k)$ represents a right channel frequency-domain signal, obtained through adjustment of the plurality of stereo parameters, of the sub-band whose index number is b in the subframe whose index number is i, i represents a subframe index number, where i=0, 1, ..., P−1, k represents a frequency bin index number, where k∈[band_limits(b), band_limits(b+1)−1], band_limits(b) represents the minimum index number of the frequency bins included in the sub-band whose sub-band index number is b, and band_limits(b+1) represents the minimum index number of the frequency bins included in the sub-band whose index number is b+1 in the subframe whose index number is i. A method for calculating downmixed signal energy and residual signal energy is not limited in this embodiment of this application.

409: Determine a residual signal encoding parameter based on downmixed signal energy and residual signal energy of the sub-bands that meet the preset condition.

410: Determine, based on the residual signal encoding parameter, whether a residual signal of each of the M sub-bands of the current frame needs to be encoded. If it is determined that the residual signal needs to be encoded, 412 is performed. If it is determined that the residual signal does not need to be encoded, 411 is performed.

411: Encode a downmixed signal of each of the M sub-bands of the current frame based on the residual signal encoding parameter. In this case, the residual signal does not need to be encoded.

412: Encode a downmixed signal and the residual signal of each of the M sub-bands of the current frame based on the residual signal encoding parameter.

For specific implementation of steps 409 to 411, refer to the related descriptions in the method 300. For brevity, details are not described herein again.

It should be noted that, in the method 300, when the encoder side divides the current frame into P subframes, where P is a positive integer greater than or equal to 2, and divides spectral coefficients of each of the P subframes into N sub-bands, and when the residual signal encoding parameter is determined based on downmixed signal energy and residual signal energy of the M sub-bands (the M sub-bands are at least some of the N sub-bands) that meet the preset condition and that are in each subframe, accordingly, in the method 300, the residual signal energy res_cod_NRG_S[b] of the sub-band whose index number is b in the current frame is a sum of residual signal energy of the sub-band whose index number is b in all of the P subframes, and the downmixed signal energy res_cod_NRG_M[b] of the sub-band whose index number is b in the current frame is a sum of downmixed signal energy of the sub-band whose index number is b in all of the P subframes.

For example, the current frame is divided into two subframes, and spectral coefficients of each of the two subframes is divided into N sub-bands. Accordingly, in the method 300, the downmixed signal energy res_cod_NRG_M[b] of the sub-band whose index number is b in the current frame is a sum of downmixed signal energy of a sub-band whose index number is b in a subframe 1 and downmixed signal energy of a sub-band whose index number is b in a subframe 2, and the residual signal energy res_cod_NRG_S[b] of the sub-band whose index number is b in the current frame is a sum of residual signal energy of the sub-band whose index number is b in the subframe 1 and residual signal energy of the sub-band whose index number is b in the subframe 2.

Figure 8:
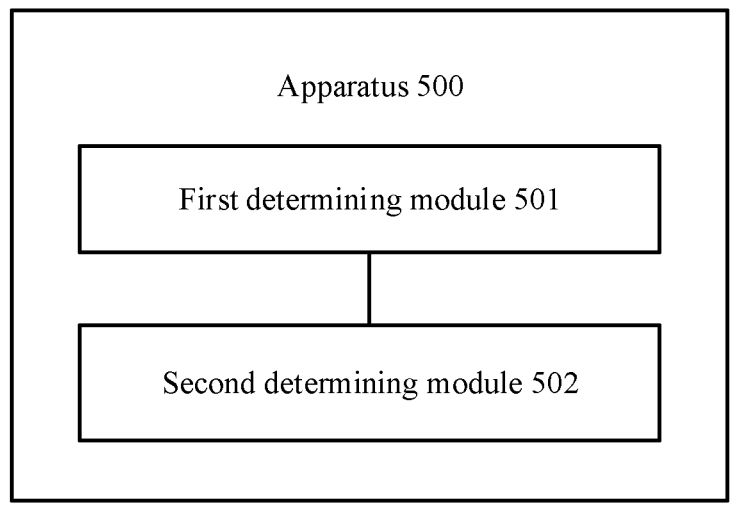
FIG. 8 is a schematic block diagram of a stereo signal encoding apparatus according to an embodiment of this application.
Figure 9:
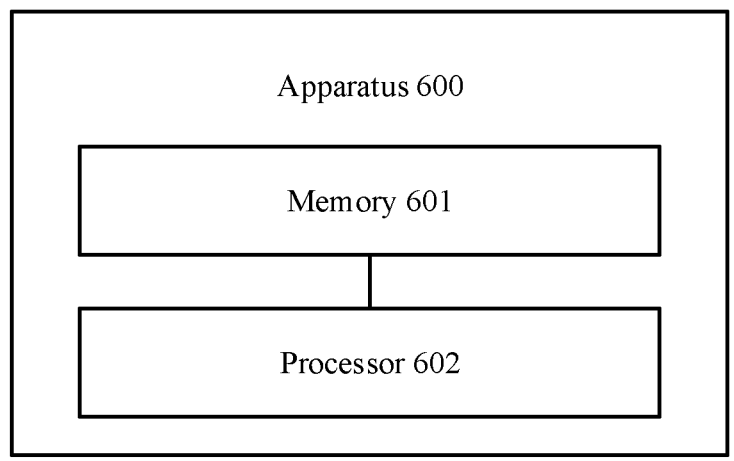
FIG. 9 is another schematic block diagram of a stereo signal encoding apparatus according to an embodiment of this application.

The foregoing describes in detail the stereo signal encoding method in the embodiments of this application with FIG. 1 to FIG. 7. The following describes a stereo signal encoding apparatus in the embodiments of this application with reference to FIG. 8 and FIG. 9. It should be understood that the apparatus in either of FIG. 8 and FIG. 9 is corresponding to the stereo signal encoding method in the embodiments of this application. In addition, the apparatus in either of FIG. 8 and FIG. 9 may perform the stereo signal encoding method in the embodiments of this application. For brevity, repeated descriptions are appropriately omitted below.

FIG. 8 is a schematic block diagram of a stereo signal encoding apparatus according to an embodiment of this application. An apparatus 500 in FIG. 8 includes a first determining module 501 configured to determine a residual signal encoding parameter of a current frame of a stereo signal based on downmixed signal energy and residual signal energy of each of M sub-bands of the current frame, where the residual signal encoding parameter of the current frame indicates whether to encode residual signals of the M sub-bands, the M sub-bands are at least some of N sub-bands, N is a positive integer greater than 1, M≤N, and M is a positive integer, and a second determining module 502 configured to determine, based on the residual signal encoding parameter of the current frame, whether to encode the residual signals of the M sub-bands of the current frame.

In this application, the residual signal encoding parameter is determined based on downmixed signal energy and residual signal energy of M sub-bands that are in the N sub-bands and that meet a preset bandwidth range, and whether to encode a residual signal of each of the M sub-bands is determined based on the residual signal encoding parameter. This avoids encoding only a downmixed signal when a coding rate is comparatively low. Alternatively, whether to encode all residual signals of sub-bands that meet a preset bandwidth range is determined based on the residual signal encoding parameter. Therefore, high-frequency distortion of a decoded stereo signal can be reduced as much as possible while a spatial sense and sound-image stability of the decoded stereo signal are improved, thereby improving encoding quality.

Optionally, in an implementation, the M sub-bands are M sub-bands whose sub-band index numbers are less than or equal to a preset maximum sub-band index number in the N sub-bands.

Optionally, in an implementation, the M sub-bands are M sub-bands whose sub-band index numbers are greater than or equal to a preset minimum sub-band index number and less than or equal to a preset maximum sub-band index number in the N sub-bands.

Optionally, in an implementation, the second determining module 502 is further configured to compare the residual signal encoding parameter with a preset first threshold, where the first threshold is greater than 0 and less than 1.0, and when the residual signal encoding parameter is less than or equal to the first threshold, determine not to encode the residual signals of the M sub-bands, or when the residual signal encoding parameter is greater than the first threshold, determine to encode the residual signal of each of the M sub-bands.

Optionally, in an implementation, the first determining module 501 is further configured to determine the residual signal encoding parameter based on the downmixed signal energy, the residual signal energy, and a side gain of each of the M sub-bands.

Optionally, in an implementation, the first determining module 501 is further configured to determine a first parameter based on the downmixed signal energy, the residual signal energy, and the side gain of each of the M sub-bands, where the first parameter indicates a value relationship between the downmixed signal energy and the residual signal energy of each of the M sub-bands, determine a second parameter based on the downmixed signal energy and the residual signal energy of each of the M sub-bands, where the second parameter indicates a value relationship between a first energy sum and a second energy sum, the first energy sum is a sum of residual signal energy and downmixed signal energy of the M sub-bands, the second energy sum is a sum of residual signal energy and downmixed signal energy of M sub-bands in a frequency-domain signal of a previous frame of the current frame, and the M sub-bands of the current frame have the same sub-band index numbers as the M sub-bands of the previous frame, and determine the residual signal encoding parameter based on the first parameter, the second parameter, and a long-term smoothing parameter of the previous frame of the current frame.

Optionally, in an implementation, the first determining module 501 is further configured to determine M energy parameters based on the downmixed signal energy, the residual signal energy, and the side gain of each of the M sub-bands, where the M energy parameters each indicate a value relationship between downmixed signal energy and residual signal energy of one of the M sub-bands respectively, and the M energy parameters one-to-one correspond to the M sub-bands, and determine an energy parameter with a largest value in the M energy parameters as the first parameter.

Optionally, in an implementation, an energy parameter of a sub-band whose sub-band index number is b in the M energy parameters determined by the first determining module 501 meets a formula:

$$\text{res\_dmx\_ratio}[b] = \text{res\_cod\_NRG\_S}[b] / (\text{res\_cod\_NRG\_S}[b] + (1-g(b)) \cdot (1-g(b)) \cdot \text{res\_cod\_NRG\_M}[b] + 1)$$

where res_dmx_ratio[b] represents the energy parameter of the sub-band whose sub-band index number is b, b is greater than or equal to 0 and is less than or equal to the preset maximum sub-band index number, res_cod_NRG_S[b] represents residual signal energy of the sub-band whose sub-band index number is b, res_cod_NRG_M[b] represents downmixed signal energy of the sub-band whose sub-band index number is b, and g(b) represents a function of a side gain side_gain[b] of the sub-band whose sub-band index number is b.

Optionally, in an implementation, the first determining module 501 is further configured to determine a first parameter based on the downmixed signal energy and the residual signal energy of each of the M sub-bands, where the first parameter indicates a value relationship between the downmixed signal energy and the residual signal energy of each of the M sub-bands, determine a second parameter based on the downmixed signal energy and the residual signal energy of each of the M sub-bands, where the second parameter indicates a value relationship between a first energy sum and a second energy sum, the first energy sum is a sum of residual signal energy and downmixed signal energy of the M sub-bands, the second energy sum is a sum of residual signal energy and downmixed signal energy of M sub-bands in a frequency-domain signal of a previous frame of the current frame, and the M sub-bands of the current frame have the same sub-band index numbers as the M sub-bands of the previous frame, and determine the residual signal encoding parameter based on the first parameter, the second parameter, and a long-term smoothing parameter of the previous frame of the current frame.

Optionally, in an implementation, the first determining module 501 is further configured to determine M energy parameters based on the downmixed signal energy and the residual signal energy of each of the M sub-bands, where the M energy parameters each indicate the value relationship between the downmixed signal energy and the residual signal energy of each of the M sub-bands, and the M energy parameters one-to-one correspond to the M sub-bands, and determine an energy parameter with a largest value in the M energy parameters as the first parameter.

Optionally, in an implementation, an energy parameter of a sub-band whose sub-band index number is b in the M energy parameters determined by the first determining module 501 meets a formula:

$$\text{res\_dmx\_ratio}[b] = \text{res\_cod\_NRG\_S}[b] / \text{res\_cod\_NRG\_M}[b],$$

where res_dmx_ratio[b] represents the energy parameter of the sub-band whose sub-band index number is b, b is greater than or equal to 0 and is less than or equal to the preset maximum sub-band index number, res_cod_NRG_S[b] represents residual signal energy of the sub-band whose sub-band index number is b, and res_cod_NRG_M[b] represents downmixed signal energy of the sub-band whose sub-band index number is b.

Optionally, in an implementation, the first determining module 501 is further configured to determine a sum of the M energy parameters as the first parameter (to be corrected) res_dmx_ratio$_1$, correct res_dmx_ratio$_1$ based on a maximum value res_dmx_ratio max in the M energy parameters and the downmixed signal energy res_cod_NRG_M[b] of each of the M sub-bands, and determine res_dmx_ratio$_2$ obtained through correction.

For example, an encoder side corrects res_dmx_ratio$_1$ according to the following formula, where M=5, and res_dmx_ratio$_2$ obtained through correction meets:

$$\text{res\_dmx\_ratio}_2 = \Big(\text{res\_dmx\_ratio\_max} >$$
$$0.32 \| \Big(\begin{matrix}\text{res\_cod\_NRG\_M}[0] + \text{res\_cod\_NRG\_M}[1] + \\ \text{res\_cod\_NRG\_M}[2]\end{matrix}\Big) >$$
$$512.0 \cdot (\text{res\_cod\_NRG\_M}[3] + \text{res\_cod\_NRG\_M}[4])\Big)?$$
$$\text{res\_dmx\_ratio\_max:res\_dmx\_ratio} \cdot 0.2$$

Optionally, in an implementation, res_dmx_ratio$_2$ obtained through correction may be further corrected.

For example, res_dmx_ratio$_3$ finally obtained through correction meets:

res_dmx_ratio$_3$=pow(res_dmx_ratio$_2$,1.2), where a pow( ) function represents an exponential function, and pow(res_dmx_ratio$_2$,1.2) represents the 1.2 power of res_dmx_ratio$_2$.

Optionally, in an implementation, the first determining module 501 is further configured to determine the first parameter based on a sum of residual signal energy of the M sub-bands and a sum of downmixed signal energy of the M sub-bands.

Further, the encoder side separately determines the sum dmx_nrg_all_curr of the downmixed signal energy of the M sub-bands and the sum res_nrg_all_curr of the residual signal energy of the M sub-bands, and determines the first parameter based on dmx_nrg_all_curr and res_nrg_all_curr.

Optionally, in an implementation, the sum dmx_nrg_all_curr of the downmixed signal energy of the M sub-bands meets:

$$\text{dmx\_nrg\_all\_curr} = \sum_{b=0}^{b=M-1} \Big(\begin{matrix}\gamma_1 \cdot \text{res\_cod\_NRG\_M}[b] + (1-\gamma_1) \cdot \\ \text{res\_cod\_NRG\_M\_prev}[b]\end{matrix}\Big),$$

where res_cod_NRG_M_prev[b] represents downmixed signal energy of a sub-band whose sub-band index number is b in the previous frame of the current frame, $\gamma_1$ represents a smoothing factor, and $\gamma_1$ is a real number greater than or equal to 0 and less than or equal to 1, for example, =0.1.

Optionally, in an implementation, the sum res_nrg_all_curr of the residual signal energy of the M sub-bands meets:

$$\text{res\_nrg\_all\_curr} = \sum_{b=0}^{b=M-1} \Big(\begin{matrix}\gamma_2 \cdot \text{res\_cod\_NRG\_S}[b] + (1-\gamma_2) \cdot \\ \text{res\_cod\_NRG\_S\_prev}[b]\end{matrix}\Big),$$

where res_cod_NRG_S_prev[b] represents residual signal energy of a sub-band whose sub-band index number is b in the previous frame of the current frame, $\gamma_2$ represents a smoothing factor, and $\gamma_2$ is a real number greater than or equal to 0 and less than or equal to 1, for example, $\gamma_2$=0.1.

The encoder side determines the first parameter res_dmx_ratio based on dmx_nrg_all_curr and res_nrg_all_curr.

For example, the first parameter res_dmx_ratio finally determined by the encoder side meets:

res_dmx_ratio=res_nrg_all_curr/dmx_nrg_all_curr.

Optionally, in an implementation, an energy parameter of a sub-band whose sub-band index number is b in the M energy parameters determined by the first determining module 501 meets a formula:

res_dmx_ratio[b]=res_cod_NRG_S[b]/res_cod_NRG_M[b], where res_dmx_ratio[b] represents the energy parameter of the sub-band whose sub-band index number is b in the M energy parameters, b is greater than or equal to 0 and is less than or equal to the preset maximum sub-band index number, res_cod_NRG_S[b] represents residual signal energy of the sub-band whose sub-band index number is b, and res_cod_NRG_M[b] represents downmixed signal energy of the sub-band whose sub-band index number is b.

Optionally, in an embodiment, the residual signal encoding parameter, determined by the first determining module 501, of the current frame is a long-term smoothing parameter of the current frame, and the long-term smoothing parameter of the current frame meets a formula:

res_dmx_ratio_lt=res_dmx_ratio·$\alpha$+res_dmx_ratio_lt_ prev·(1−$\alpha$), where res_dmx_ratio_lt represents the long-term smoothing parameter of the current frame, res_dmx_ratio represents the first parameter, res_dmx_ratio_lt_prev represents the long-term smoothing parameter of the previous frame of the current frame, and 0<$\alpha$<1, and when the second parameter is greater than a preset third threshold, a value of $\alpha$ when the first parameter is less than a preset second threshold is greater than a value of $\alpha$ when the first parameter is greater than or equal to the preset second threshold, the second threshold is greater than or equal to 0 and less than or equal to 0.6, and the third threshold is greater than or equal to 2.7 and less than or equal to 3.7, or when the second parameter is less than a preset fifth threshold, a value of $\alpha$ when the first parameter is greater than a preset fourth threshold is greater than a value of $\alpha$ when the first parameter is less than or equal to the preset fourth threshold, the fourth threshold is greater than or equal to 0 and less than or equal to 0.9, and the fifth threshold is greater than or equal to 0 and less than or equal to 0.71, or a value of $\alpha$ when the first parameter is less than a preset second threshold and the second parameter is greater than a preset third threshold is greater than a value of $\alpha$ when the second parameter is greater than or equal to a preset fifth threshold and is less than or equal to the preset third threshold, the second threshold is greater than or equal to 0 and less than or equal to 0.6, the third threshold is greater than or equal to 2.7 and less than or equal to 3.7, and the fifth threshold is greater than or equal to 0 and less than or equal to 0.71.

Optionally, in an embodiment, the second determining module 502 is further configured to, when it is determined to encode the residual signals of the M sub-bands, encode downmixed signals and the residual signals of the M sub-bands, or when it is determined not to encode the residual signals of the M sub-bands, encode downmixed signals of the M sub-bands.

FIG. 9 is a schematic block diagram of a stereo signal encoding apparatus according to an embodiment of this application. An apparatus 600 in FIG. 9 includes a memory 601 configured to store a program, and a processor 602 configured to execute the program stored in the memory 601, where when the program in the memory is executed, the processor 602 is further configured to determine a residual signal encoding parameter of a current frame of a stereo signal based on downmixed signal energy and residual signal energy of each of M sub-bands of the current frame, where the residual signal encoding parameter of the current frame indicates whether to encode residual signals of the M sub-bands, the M sub-bands are at least some of N sub-bands, N is a positive integer greater than 1, M≤N, and M is a positive integer, and determine, based on the residual signal encoding parameter, whether to encode the residual signals of the M sub-bands of the current frame.

Optionally, in an implementation, the M sub-bands are M sub-bands whose sub-band index numbers are less than or equal to a preset maximum sub-band index number in the N sub-bands.

Optionally, in an implementation, the M sub-bands are M sub-bands whose sub-band index numbers are greater than or equal to a preset minimum sub-band index number and less than or equal to a preset maximum sub-band index number in the N sub-bands.

Optionally, in an implementation, the processor 602 is further configured to compare the residual signal encoding parameter with a preset first threshold, where the first threshold is greater than 0 and less than 1.0, and when the residual signal encoding parameter is less than the first threshold, determine not to encode the residual signals of the M sub-bands, or when the residual signal encoding parameter is greater than the first threshold, determine to encode the residual signal of each of the M sub-bands.

Optionally, in an implementation, the processor 602 is further configured to determine the residual signal encoding parameter based on the downmixed signal energy, the residual signal energy, and a side gain of each of the M sub-bands.

Optionally, in an implementation, the processor 602 is further configured to determine a first parameter based on the downmixed signal energy, the residual signal energy, and the side gain of each of the M sub-bands, where the first parameter indicates a value relationship between the downmixed signal energy and the residual signal energy of each of the M sub-bands, determine a second parameter based on the downmixed signal energy and the residual signal energy of each of the M sub-bands, where the second parameter indicates a value relationship between a first energy sum and a second energy sum, the first energy sum is a sum of residual signal energy and downmixed signal energy of the M sub-bands, the second energy sum is a sum of residual signal energy and downmixed signal energy of M sub-bands in a frequency-domain signal of a previous frame of the current frame, and the M sub-bands of the current frame have the same sub-band index numbers as the M sub-bands of the previous frame, and determine the residual signal encoding parameter based on the first parameter, the second parameter, and a long-term smoothing parameter of the previous frame of the current frame.

Optionally, in an implementation, the processor 602 is further configured to determine M energy parameters based on the downmixed signal energy, the residual signal energy, and the side gain of each of the M sub-bands, where the M energy parameters each indicate a value relationship between downmixed signal energy and residual signal energy of one of the M sub-bands respectively, and the M energy parameters one-to-one correspond to the M sub-bands, and determine an energy parameter with a largest value in the M energy parameters as the first parameter.

Optionally, in an implementation, an energy parameter of a sub-band whose sub-band index number is b in the M energy parameters determined by the processor 602 meets a formula:

res_dmx_ratio[b]=res_cod_NRG_S[b]/
(res_cod_NRG_S[b]+(1−g(b))·(1−
g(b))·res_cod_NRG_M[b]+1)

where res_dmx_ratio[b] represents the energy parameter of the sub-band whose sub-band index number is b, b is greater than or equal to 0 and is less than or equal to the preset maximum sub-band index number, res_cod_NRG_S[b] represents residual signal energy of the sub-band whose sub-band index number is b, res_cod_NRG_M[b] represents downmixed signal energy of the sub-band whose sub-band index number is b, and g(b) represents a function of a side gain side_gain[b] of the sub-band whose sub-band index number is b.

Optionally, in an implementation, the processor 602 is further configured to determine a first parameter based on the downmixed signal energy and the residual signal energy of each of the M sub-bands, where the first parameter indicates a value relationship between the downmixed signal energy and the residual signal energy of each of the M sub-bands, determine a second parameter based on the downmixed signal energy and the residual signal energy of each of the M sub-bands, where the second parameter indicates a value relationship between a first energy sum and a second energy sum, the first energy sum is a sum of residual signal energy and downmixed signal energy of the M sub-bands, the second energy sum is a sum of residual signal energy and downmixed signal energy of M sub-bands in a frequency-domain signal of a previous frame of the current frame, and the M sub-bands of the current frame have the same sub-band index numbers as the M sub-bands of the previous frame, and determine the residual signal encoding parameter based on the first parameter, the second parameter, and a long-term smoothing parameter of the previous frame of the current frame.

Optionally, in an implementation, the processor 602 is further configured to determine M energy parameters based on the downmixed signal energy and the residual signal energy of each of the M sub-bands, where the M energy parameters each indicate the value relationship between the downmixed signal energy and the residual signal energy of each of the M sub-bands, and the M energy parameters one-to-one correspond to the M sub-bands, and determine an energy parameter with a largest value in the M energy parameters as the first parameter.

Optionally, in an implementation, an energy parameter of a sub-band whose sub-band index number is b in the M energy parameters determined by the processor 602 meets a formula:

res_dmx_ratio[b]=res_cod_NRG_S[b]/
res_cod_NRG_M[b], where res_dmx_ratio[b] represents the energy parameter of the sub-band whose sub-band index number is b, b is greater than or equal to 0 and is less than or equal to the preset maximum sub-band index number, res_cod_NRG_S[b] represents residual signal energy of the sub-band whose sub-band index number is b, and res_cod_NRG_M[b] represents downmixed signal energy of the sub-band whose sub-band index number is b.

Optionally, in an implementation, the processor 602 is further configured to determine a sum of the M energy parameters as the first parameter (to be corrected) $res\_dmx\_ratio_1$, correct $res\_dmx\_ratio_1$ based on a maximum value res_dmx_ratio max in the M energy parameters and the downmixed signal energy res_cod_NRG_M[b] of each of the M sub-bands, and determine $res\_dmx\_ratio_2$ obtained through correction.

For example, an encoder side corrects $res\_dmx\_ratio_1$ according to the following formula, where M=5, and $res\_dmx\_ratio_2$ obtained through correction meets:

$$res\_dmx\_ratio_2 = \Big(res\_dmx\_ratio\_max >$$
$$0.32 \Big\| \Big(\frac{res\_cod\_NRG\_M[0] + res\_cod\_NRG\_M[1] +}{res\_cod\_NRG\_M[2]}\Big) >$$
$$512.0 \cdot (res\_cod\_NRG\_M[3] + res\_cod\_NRG\_M[4])\Big)?$$
$$res\_dmx\_ratio\_max:res\_dmx\_ratio \cdot 0.2$$

Optionally, in an implementation, $res\_dmx\_ratio_2$ obtained through correction may be further corrected.

For example, $res\_dmx\_ratio_3$ finally obtained through correction meets:

$$res\_dmx\_ratio_3 = pow(res\_dmx\_ratio_2, 1.2),$$

where a pow( ) function represents an exponential function, and $pow(res\_dmx\_ratio_2, 1.2)$ represents the 1.2 power of $res\_dmx\_ratio_2$.

Optionally, in an implementation, the processor 602 is further configured to determine the first parameter based on a sum of residual signal energy of the M sub-bands and a sum of downmixed signal energy of the M sub-bands.

Further, the encoder side separately determines the sum dmx_nrg_all_curr of the downmixed signal energy of the M sub-bands and the sum res_nrg_all_curr of the residual signal energy of the M sub-bands, and determines the first parameter based on dmx_nrg_all_curr and res_nrg_all_curr.

Optionally, in an implementation, the sum dmx_nrg_all_curr of the downmixed signal energy of the M sub-bands meets:

$$dmx\_nrg\_all\_curr = \sum_{b=0}^{b=M-1} \Big(\gamma_1 \cdot res\_cod\_NRG\_M[b] + (1-\gamma_1) \cdot res\_cod\_NRG\_M\_prev[b]\Big),$$

where res_cod_NRG_M_prev[b] represents downmixed signal energy of a sub-band whose sub-band index number is b in the previous frame of the current frame, $\gamma_1$ represents a smoothing factor, and $\gamma_1$ is a real number greater than or equal to 0 and less than or equal to 1, for example, $\gamma_1=0.1$.

Optionally, in an implementation, the sum res_nrg_all_curr of the residual signal energy of the M sub-bands meets:

$$res\_nrg\_all\_curr = \sum_{b=0}^{b=M-1} \Big(\gamma_2 \cdot res\_cod\_NRG\_S[b] + (1-\gamma_2) \cdot res\_cod\_NRG\_S\_prev[b]\Big),$$

where res_cod_NRG_S_prev[b] represents residual signal energy of a sub-band whose sub-band index number is b in the previous frame of the current frame, $\gamma_2$ represents a smoothing factor, and $\gamma_2$ is a real number greater than or equal to 0 and less than or equal to 1, for example, $\gamma_2=0.1$.

The encoder side determines the first parameter res_dmx_ratio based on dmx_nrg_all_curr and res_nrg_all_curr.

For example, the first parameter res_dmx_ratio finally determined by the encoder side meets:

res_dmx_ratio=res_nrg_all_curr/dmx_nrg_all_curr.

Optionally, in an implementation, an energy parameter of a sub-band whose sub-band index number is b in the M energy parameters determined by the processor 602 meets a formula:

res_dmx_ratio[b]=res_cod_NRG_S[b]/
res_cod_NRG_M[b], where res_dmx_ratio[b] represents the energy parameter of the sub-band whose sub-band index number is b in the M energy parameters, b is greater than or equal to 0 and is less than or equal to the preset maximum sub-band index number, res_cod_NRG_S[b] represents residual signal energy of the sub-band whose sub-band index number is b, and res_cod_NRG_M[b] represents downmixed signal energy of the sub-band whose sub-band index number is b.

Optionally, in an implementation, when the first parameter is less than a preset second threshold and the second parameter is greater than a preset third threshold, the residual signal encoding parameter, determined by the processor 602, of the current frame is the long-term smoothing parameter of the current frame, and the long-term smoothing parameter of the current frame meets a formula:

res_dmx_ratio_lt=res_dmx_ratio·α+res_dmx_ratio_lt-
_prev·(1−α), where res_dmx_ratio_lt represents the long-term smoothing parameter of the current frame, res_dmx_ratio represents the first parameter, res_dmx_ratio_lt_prev represents the long-term smoothing parameter of the previous frame of the current frame, and 0<α<1, and when the second parameter is greater than the preset third threshold, a value of α when the first parameter is less than the preset second threshold is greater than a value of α when the first parameter is greater than or equal to the preset second threshold, the second threshold is greater than or equal to 0 and less than or equal to 0.6, and the third threshold is greater than or equal to 2.7 and less than or equal to 3.7, or when the second parameter is less than a preset fifth threshold, a value of α when the first parameter is greater than a preset fourth threshold is greater than a value of α when the first parameter is less than or equal to the preset fourth threshold, the fourth threshold is greater than or equal to 0 and less than or equal to 0.9, and the fifth threshold is greater than or equal to 0 and less than or equal to 0.71, or a value of α when the first parameter is less than the preset second threshold and the second parameter is greater than the preset third threshold is greater than a value of α when the second parameter is greater than or equal to a preset fifth threshold and is less than or equal to the preset third threshold, the second threshold is greater than or equal to 0 and less than or equal to 0.6, the third threshold is greater than or equal to 2.7 and less than or equal to 3.7, and the fifth threshold is greater than or equal to 0 and less than or equal to 0.71.

Optionally, in an embodiment, the processor 602 is further configured to when it is determined to encode the residual signals of the M sub-bands, encode downmixed signals and the residual signals of the M sub-bands, or when it is determined not to encode the residual signals of the M sub-bands, encode downmixed signals of the M sub-bands.

This application further provides a chip. The chip includes a processor and a communications interface. The communications interface is configured to communicate with an external device, and the processor is configured to perform the stereo signal encoding method in the embodiments of this application.

Optionally, in an implementation, the chip may further include a memory. The memory stores an instruction, and the processor is configured to execute the instruction stored in the memory. When the instruction is executed, the processor is configured to perform the stereo signal encoding method in the embodiments of this application.

Optionally, in an implementation, the chip is integrated into a terminal device or a network device.

This application provides a computer readable storage medium. The computer readable storage medium stores program code to be executed by a device. The program code includes an instruction for performing the stereo signal encoding method in the embodiments of this application.

It should be understood that, the processor mentioned in the embodiments of the present disclosure may be a central processing unit (CPU), or may be another general-purpose processor, a digital signal processor (DSP), an application-specific integrated circuit (ASIC), a field-programmable gate array (FPGA), or another programmable logic device, discrete gate or transistor logic device, discrete hardware component, or the like. The general-purpose processor may be a microprocessor, or the processor may be any conventional processor or the like.

It may be understood that the memory mentioned in the embodiments of the present disclosure may be a volatile memory or a nonvolatile memory, or may include a volatile memory and a nonvolatile memory. The nonvolatile memory may be a read-only memory (ROM), a programmable ROM (PROM), an erasable PROM (EPROM), an electrically EPROM (EEPROM), or a flash memory. The volatile memory may be a random-access memory (RAM), used as an external cache. Through example but not limitative description, many forms of RAMs may be used, for example, a static RAM (SRAM), a dynamic RAM (DRAM), a synchronous DRAM (SDRAM), a double data rate (DDR) SDRAM, an enhanced SDRAM (ESDRAM), a synchlink DRAM (SLDRAM), and a direct rambus (DR) RAM.

It should be noted that when the processor is a general-purpose processor, a DSP, an ASIC, an FPGA, or another programmable logic device, discrete gate, transistor logic device, or discrete hardware component, the memory (a storage module) is integrated into the processor.

It should be noted that the memory described in this specification includes but is not limited to these memories and any memory of another proper type.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, division into units is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer readable storage medium. Based on such an understanding, the technical solutions of this application essentially, or the part contributing to the other approaches, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a Universal Serial Bus (USB) flash drive, a removable hard disk, a ROM, a RANI, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:
obtaining M first downmixed signal energies of M first sub-bands of a current frame of a stereo signal, wherein the current frame comprises N sub-bands that comprise the M first sub-bands, wherein M<N, wherein M and N are positive integers, and wherein N is greater than 1;
obtaining M first residual signal energies of the M first sub-bands;
obtaining, based on the M first downmixed signal energies and the M first residual signal energies, a residual signal encoding parameter of the current frame;
determining, based on the residual signal encoding parameter, whether to encode residual signals of the current frame;
encoding the residual signals when determining to encode the residual signals; and avoiding encoding the residual signals when determining not to encode the residual signals.

2. The method of claim 1, wherein determining whether to encode the residual signal comprises:
   comparing the residual signal encoding parameter with a preset first threshold that is greater than zero and less than 1;
   determining not to encode the residual signals when the residual signal encoding parameter is less than or equal to the preset first threshold; and
   determining to encode the residual signals when the residual signal encoding parameter is greater than the preset first threshold.

3. The method of claim 1, wherein obtaining the residual signal encoding parameter comprises:
   obtaining, based on the M first downmixed signal energies and the M first residual signal energies, a first parameter that indicates a first relationship between a downmixed signal energy of each of the M first sub-bands and a residual signal energy of each of the M first sub-bands;
   obtaining, based on the M first downmixed signal energies and the M first residual signal energies, a second parameter that indicates a second relationship between a first energy sum and a second energy sum, wherein the first energy sum is a sum of the M first residual signal energies and the M first downmixed signal energies, wherein the second energy sum is a sum of M second residual signal energies of M second sub-bands of a previous frame and M second downmixed signal energies of the M second sub-bands, and wherein the M first sub-bands have same sub-band index numbers as the M second sub-bands; and
   obtaining the residual signal encoding parameter based on the first parameter, the second parameter, and a first long-term smoothing parameter of the previous frame.

4. The method of claim 3, wherein the residual signal encoding parameter of the current frame is a second long-term smoothing parameter of the current frame, and wherein the method further comprises:
   obtaining the second long-term smoothing parameter using the following formula:

$$\text{res\_dmx\_ratio\_lt} = \text{res\_dmx\_ratio} \cdot \alpha + \text{res\_dmx\_ratio\_lt\_prev} \cdot (1-\alpha),$$

wherein res_dmx_ratio_lt represents the second long-term smoothing parameter, wherein res_dmx_ratio represents the first parameter, wherein res_dmx_ratio_lt_prev represents the first long-term smoothing parameter, and wherein $0<\alpha<1$.

5. The method of claim 3, further comprising:
   obtaining M energy parameters based on the M first downmixed signal energies and the M first residual signal energies, wherein each of the M energy parameters indicates the first relationship, and wherein the M energy parameters and the M first sub-bands comprise a one-to-one correspondence; and
   setting an energy parameter with a largest value in the M energy parameters as the first parameter.

6. The method of claim 5, wherein a sub-band index number of a $b^{th}$ sub-band is b, and wherein the method further comprises obtaining a $b^{th}$ energy parameter of the $b^{th}$ sub-band in the M energy parameters using the following formula:

$$\text{res\_dmx\_ratio}[b] = \text{res\_cod\_NRG\_S}[b]/(\text{res\_cod\_NRG\_S}[b]+(1-g(b))\cdot(1-g(b))\text{res\_cod\_NRG\_M}[b]+1),$$

wherein res_dmx_ratio[b] represents the $b^{th}$ energy parameter, wherein b is greater than or equal to zero and is less than or equal to a preset maximum sub-band index number, wherein res_cod_NRG_S[b] represents a residual signal energy of the $b^{th}$ sub-band, wherein res_cod_NRG_M[b] represents a downmixed signal energy of the $b^{th}$ sub-band, and wherein g(b) represents a function of a side gain of the $b^{th}$ sub-band.

7. An apparatus comprising:
   at least one processor; and
   one or more memories coupled to the at least one processor and configured to store programming instructions for execution by the at least one processor to cause the apparatus to:
   obtain M first downmixed signal energies of M first sub-bands of a current frame of a stereo signal, wherein the current frame includes N sub-bands that comprise the M first sub-bands, wherein M<N, wherein M and N are positive integers, and wherein N is greater than 1;
   obtain M first residual signal energies of the M first sub-bands;
   obtain, based on the M first downmixed signal energies and the M first residual signal energies, a residual signal encoding parameter of the current frame;
   determine, based on the residual signal encoding parameter, whether to encode residual signals of the current frame;
   encode the residual signals when determining to encode the residual signals; and
   avoid encoding the residual signals when determining not to encode the residual signals.

8. The apparatus of claim 7, wherein the programming instructions for execution by the at least one processor further cause the apparatus to:
   compare the residual signal encoding parameter with a preset first threshold that is greater than zero and less than 1;
   determine not to encode the residual signals when the residual signal encoding parameter is less than or equal to the preset first threshold; and
   determine to encode the residual signals when the residual signal encoding parameter is greater than the preset first threshold.

9. The apparatus of claim 7, wherein the programming instructions for execution by the at least one processor further cause the apparatus to:
   obtain a first parameter based on the M first downmixed signal energies and the M first residual signal energies, wherein the first parameter indicates a first relationship between a downmixed signal energy of each of the M first sub-bands and a residual signal energy of each of the M first sub-bands;
   obtain a second parameter based on the M first downmixed signal energies and the M first residual signal energies, wherein the second parameter indicates a second relationship between a first energy sum and a second energy sum, wherein the first energy sum is a sum of the M first residual signal energies and the M first downmixed signal energies, wherein the second energy sum is a sum of M second residual signal energies of M second sub-bands of a previous frame and M second downmixed signal energies of the M second sub-bands, and wherein the M first sub-bands have same sub-band index numbers as the M second sub-bands; and obtain the residual signal encoding parameter based on the first parameter, the second parameter, and a first long-term smoothing parameter of the previous frame.

10. The apparatus of claim 9, wherein the residual signal encoding parameter of the current frame is a second long-term smoothing parameter of the current frame, and wherein the programming instructions for execution by the at least one processor further cause the apparatus to:
obtain the second long-term smoothing parameter using the following formula:

$$res\_dmx\_ratio\_lt = res\_dmx\_ratio \cdot \alpha + res\_dmx\_ratio\_lt\_prev \cdot (1-\alpha),$$

wherein res_dmx_ratio_lt represents the second long-term smoothing parameter, wherein res_dmx_ratio represents the first parameter, wherein res_dmx_ratio_lt_prev represents the first long-term smoothing parameter, and wherein $0<\alpha<1$.

11. The apparatus of claim 9, wherein the programming instructions for execution by the at least one processor further cause the apparatus to:
obtain M energy parameters based on the M first downmixed signal energies and the M first residual signal energies, wherein each of the M energy parameters indicates the first relationship, and wherein the M energy parameters and the M first sub-bands comprise a one-to-one correspondence; and
set an energy parameter with a largest value in the M energy parameters as the first parameter.

12. The apparatus of claim 11, wherein a sub-band index number of a $b^{th}$ sub-band is b, and wherein the programming instructions for execution by the at least one processor further cause the apparatus to:
obtain a $b^{th}$ energy parameter of the $b^{th}$ sub-band in the M energy parameters using the following formula:

$$res\_dmx\_ratio[b] = res\_cod\_NRG\_S[b] / (res\_cod\_NRG\_S[b] + (1-g(b)) \cdot (1-g(b)) \, res\_cod\_NRG\_M[b] + 1),$$

wherein res_dmx_ratio[b] represents the $b^{th}$ energy parameter, wherein b is greater than or equal to zero and is less than or equal to a preset maximum sub-band index number, wherein res_cod_NRG_S[b] represents a residual signal energy of the $b^{th}$ sub-band, wherein res_cod_NRG_M[b] represents a downmixed signal energy of the $b^{th}$ sub-band, and wherein g(b) represents a function of a side gain of the $b^{th}$ sub-band.

13. A non-transitory computer readable medium configured to store instructions and that, when executed by a processor, cause an apparatus to:
obtain M first downmixed signal energies of M first sub-bands of a current frame of a stereo signal, wherein the current frame includes N sub-bands that comprise the M first sub-bands, wherein M<N, wherein M and N are positive integers, and wherein N is greater than 1;
obtain M first residual signal energies of the M first sub-bands;
obtain, based on the M first downmixed signal energies and the M first residual signal energies, a residual signal encoding parameter of the current frame;
determine, based on the residual signal encoding parameter, whether to encode residual signals of the current frame;
encode the residual signals when determining to encode the residual signals; and
avoid encoding the residual signals when determining not to encode the residual signals.

14. The non-transitory computer readable medium of claim 13, wherein the instructions when executed by the processor further cause the apparatus to:
compare the residual signal encoding parameter with a preset first threshold that is greater than zero and less than 1;
determine not to encode the residual signals when the residual signal encoding parameter is less than or equal to the preset first threshold; and
determine to encode the residual signals when the residual signal encoding parameter is greater than the preset first threshold.

15. The non-transitory computer readable medium of claim 13, wherein the instructions when executed by the processor further cause the apparatus to:
obtain a first parameter based on the M first downmixed signal energies and the M first residual signal energies, wherein the first parameter indicates a first relationship between a downmixed signal energy of each of the M first sub-bands and a residual signal energy of each of the M first sub-bands;
obtain a second parameter based on the M first downmixed signal energies and the M first residual signal energies, wherein the second parameter indicates a second relationship between a first energy sum and a second energy sum, wherein the first energy sum is a sum of the M first residual signal energies and the M first downmixed signal energies, wherein the second energy sum is a sum of M second residual signal energies of M second sub-bands of a previous frame and M second downmixed signal energies of the M second sub-bands, and wherein the M first sub-bands have same sub-band index numbers as the M second sub-bands; and
obtain the residual signal encoding parameter based on the first parameter, the second parameter, and a first long-term smoothing parameter of the previous frame.

16. The non-transitory computer readable medium of claim 15, wherein the residual signal encoding parameter of the current frame is a second long-term smoothing parameter of the current frame, and wherein the instructions when executed by the processor further cause the apparatus to:
obtain the second long-term smoothing parameter using the following formula:

$$res\_dmx\_ratio\_lt = res\_dmx\_ratio \cdot \alpha + res\_dmx\_ratio\_lt\_prev \cdot (1-\alpha),$$

wherein res_dmx_ratio_lt represents the second long-term smoothing parameter, wherein res_dmx_ratio represents the first parameter, wherein res_dmx_ratio_lt_prev represents the first long-term smoothing parameter, and wherein $0<\alpha<1$.

17. The non-transitory computer readable medium of claim 15, wherein the instructions when executed by the processor further cause the apparatus to:
obtain M energy parameters based on the M first downmixed signal energies and the M first residual signal energies, wherein each of the M energy parameters indicates the first relationship, and wherein the M energy parameters and the M first sub-bands comprise a one-to-one correspondence; and
set an energy parameter with a largest value in the M energy parameters as the first parameter.

18. The non-transitory computer readable medium of claim 17, wherein a sub-band index number of a $b^{th}$ sub-band is b, and wherein the instructions when executed by the processor further cause the apparatus to:

obtain a $b^{th}$ energy parameter of the $b^{th}$ sub-band in the M energy parameters using the following formula:

$$\text{res\_dmx\_ratio}[b] = \text{res\_cod\_NRG\_S}[b] / (\text{res\_cod\_NRG\_S}[b] + (1-g(b)) \cdot (1-g(b)) \text{res\_cod\_NRG\_M}[b] + 1),$$

wherein res_dmx_ratio[b] represents the $b^{th}$ energy parameter, wherein b is greater than or equal to zero and is less than or equal to a preset maximum sub-band index number, wherein res_cod_NRG_S[b] represents residual a signal energy of the $b^{th}$ sub-band, wherein res_cod_NRG_M[b] represents a downmixed signal energy of the $b^{th}$ sub-band, and wherein g(b) represents a function of a side gain of the $b^{th}$ sub-band.

19. The non-transitory computer readable medium of claim 13, wherein the M first sub-bands have first sub-band indexes that are less than a preset maximum sub-band index number.

20. The non-transitory computer readable medium of claim 19, wherein the instructions when executed by the processor further cause the apparatus to:
compare second sub-band indexes of the N sub-bands; and
determine the M first sub-bands based on comparing the second sub-band indexes of the N sub-bands.

* * * * *